US006207362B1

(12) United States Patent
Dagan et al.

(10) Patent No.: US 6,207,362 B1
(45) Date of Patent: Mar. 27, 2001

(54) TOUGH DURABLE IMAGING CELLULOSE BASE MATERIAL

(75) Inventors: Sandra J. Dagan, Churchville; Peter T. Aylward, Hilton; Robert P. Bourdelais, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/392,949

(22) Filed: Sep. 9, 1999

(51) Int. Cl.[7] .............................. G03C 1/79; G03C 1/795; G03C 1/93; B32B 23/04; B32B 23/06

(52) U.S. Cl. .......................... 430/533; 430/536; 430/538; 428/535; 428/537.5; 162/130; 162/145; 162/146; 162/157.6

(58) Field of Search ..................................... 430/538, 536, 430/533; 428/537.5, 535; 162/146, 145, 157.6, 130

(56) References Cited

U.S. PATENT DOCUMENTS

| | | | | |
|---|---|---|---|---|
| 3,773,513 | * | 11/1973 | MacClaren | 434/538 |
| 4,377,616 | | 3/1983 | Asbcraft et al. . | |
| 4,632,869 | | 12/1986 | Park et al. . | |
| 4,758,462 | | 7/1988 | Park et al. . | |
| 4,774,224 | | 9/1988 | Campbell | 430/201 |
| 4,994,147 | | 2/1991 | Foley et al. | 162/137 |
| 5,466,519 | | 11/1995 | Shirakura et al. | 430/538 |
| 5,476,708 | | 12/1995 | Reed et al. | 430/538 |
| 5,514,460 | | 5/1996 | Surman et al. | 428/304.4 |
| 5,866,282 | | 2/1999 | Bourdelais et al. | 430/538 |
| 5,888,683 | | 3/1999 | Gula et al. | 430/538 |
| 6,030,742 | * | 2/2000 | Bourdelais et al. | 430/538 |

* cited by examiner

*Primary Examiner*—Richard L. Schilling
(74) *Attorney, Agent, or Firm*—Paul A. Leipold

(57) ABSTRACT

The invention relates to an imaging element comprising a base comprising a cellulose fiber containing paper, wherein said paper has a tear resistance of between 200 and 1800 Newton.

79 Claims, No Drawings

TOUGH DURABLE IMAGING CELLULOSE BASE MATERIAL

FIELD OF THE INVENTION

This invention relates to imaging materials. In a preferred form it relates to base materials for photographic papers.

BACKGROUND OF THE INVENTION

In the formation of photographic paper it is known that the base paper has applied thereto a layer of polyolefin resin, typically polyethylene. This layer serves to provide waterproofing to the paper and provide a smooth surface on which the photosensitive layers are formed. The formation of the smooth surface is controlled by both the roughness of the chill roll where the polyolefin resin is cast, the amount of resin applied to the base paper surface and the roughness of the base paper. Since the addition of polyolefin resin does not significantly improve the tear resistance or tear strength of the base paper, the tear resistance of typical photographic paper is a function of the tear resistance of the cellulose paper base. Typical photographic paper bases have a tear resistance between 70 and 140 N.

Typical photographic grade cellulose paper base has a particularly objectionable roughness in the spatial frequency range of 0.30 to 6.35 mm. In this spatial frequency range, a surface roughness average greater than 0.50 micrometers can be objectionable to consumers. Visual roughness greater than 0.50 micrometers in usually referred to as orange peel. An imaging element with roughness less than 1.10 $\mu$m at a spatial frequency of between 200 cycles/mm and 1300 cycles/mm is considered smooth and is typically defined as a glossy image.

It has been proposed in U.S. Pat. No. 5,866,282 Bourdelais et al. to utilize a composite support material with laminated biaxially oriented polyolefin sheets as a photographic imaging material. In U.S. Pat. No. 5,866,282, biaxially oriented polyolefin sheets are extrusion laminated to cellulose paper to create a support for silver halide imaging layers. The biaxially oriented sheets described in U.S. Pat. No. 5,866,282 have a microvoided layer in combination with coextruded layers that contain white pigments. The composite imaging support structure described in U.S. Pat. No. 5,866,282 has been found to be more durable, and more tear resistant sharper and provide brighter reflective images than prior art photographic paper imaging supports that use cast melt extruded polyethylene layers coated on cellulose paper. The tear resistance of the paper base in U.S. Pat. No. 5,866,282 is between 100 and 160 N.

It has been proposed in U.S. Pat. No. 5,244,861 to utilize biaxially oriented polypropylene laminated to a base paper for use as a reflective imaging receiver for thermal dye transfer imaging. While the invention does provide an excellent material for the thermal dye transfer imaging process, this invention can not be used for imaging systems that are gelatin based such as silver halide and ink jet because of the sensitivity of the gel imaging systems to humidity. The humidity sensitivity of the gel imaging layer creates unwanted imaging element curl. One factor contributing to the imaging element curl is the ratio of base paper stiffness in the machine direction to the cross direction. Traditional photographic base papers have a machine direction to cross direction stiffness ratio, as measured by Young's modulus ratio, of approximately 2.0. For a composite photographic material with biaxially oriented polyolefin sheets laminated to a base paper it would be desirable if the machine direction to cross direction stiffness ratio for the paper were approximately 1.6 to reduce imaging element curl.

A receiving element with cellulose paper support for use in thermal dye transfer has been proposed in U.S. Pat. No. 5,288,690 (Warner et al.). While the cellulose paper in U.S. Pat. No. 5,288,690 solved many of the problems existing with thermal dye transfer printing on a laminated cellulose paper, this cellulose paper is not suitable for a laminated cellulose photographic paper since this paper has undesirable surface roughness in the spatial frequency range of 0.30 to 6.35 mm and the pulp used in U.S. Pat. No. 5,288,690 is expensive compared to alternative pulps. Further, the paper base discussed in U.S. Pat. No. 5,288,690 has a tear strength of between 80 and 150 N.

PROBLEM TO BE SOLVED BY THE INVENTION

There remains a need for a more effective base paper to provide an improved smooth surface as well as provide a tear resistant photographic element.

SUMMARY OF THE INVENTION

An object of the invention is to provide an imaging material that has improved strength properties.

A further object of this invention is to provide a base paper that provides a tear resistant photographic element.

Another object of this invention is to improve the durability of the imaging material.

These and other objects of the invention are accomplished by an imaging element comprising a base comprising a cellulose fiber containing paper, wherein said paper has a tear resistance of between 200 and 1800 Newton.

ADVANTAGEOUS EFFECT OF THE INVENTION

The invention provides an improved paper for imaging elements. It particularly provides an improved paper for imaging elements that are smoother, more tear resistant and are low cost compared to a substrate made from polymer.

DETAILED DESCRIPTION OF THE INVENTION

There are numerous advantages of the invention over prior practices in the art. The invention provides tear resistance to a. reflective image that will improve the durability of images as they are viewed, handled and stored by consumers. Tear resistant images are perceptually preferred and thus have significant commercial value, over images that tear easily and thus are subjected to damage during viewing, handling and storage. Tear resistance also improves the efficiency of the imaging materials to be transported though digital printing equipment such as ink jet printers as well as the silver halide printing and development equipment. A tear resistant imaging material tends to reduce the frequency of web breaks in equipment thereby improving printing productivity. Tear resistance also is desirable for applications such as display materials that require a tear resistant support materials. Currently display materials are post process laminated to improve tear resistance, a tear resistant paper would reduce the need for expensive post process lamination for tear resistance. Further, the invention provides an imaging element that is strong and has has a smoother surface, increasing the commercial value of the imaging element by providing a glossy reflective print material. Another advantage is the significant reduction in cellulose paper dust generation as this base paper is cut in both the cross and machine directions in imaging converting applications such as the slitting of wide rolls of imaging support, punching of imaging elements as in photographic processing equipment and chopping in photographic finishing equipment. Replacing the cellulose fibers with non cellulose paper fibers reduces dusting. These and other advantages will be apparent from the detailed description below.

In order to provide an imaging element with sufficient tear resistance, the tear resistance of the base cellulose paper has been increased over prior art cellulose base papers. It has been found that a base comprising a cellulose fiber containing paper, wherein said paper has a tear resistance of between 200 and 1800 Newton provides an imaging element with tear resistance. A tear strength less than 180 N is not perceptually different from prior art materials. A tear strength greater than 2000 N exceeds the ability of a typical consumer to tear an image. Since it is difficult to obtain tear resistance above 200 N with cellulose fiber alone, the paper of this invention requires additional materials for a tear strength above 200 N. By adding high strength materials to the paper prior to forming on a wire or applying a coating to the paper after formation on the wire, the tear strength of the paper is improved as the high strength materials contribute to the tear resistance of the base paper. It has been found that the addition of polymer fibers, latex polymers, glass fibers and woven polymer fibers to cellulose paper fibers provides a paper base with a tear strength greater that 200 N.

By providing a base paper with a tear strength between 200 and 1800 N, the tear strength of an imaging element that is melt extruded with polymer increases over prior art materials that utilize a cellulose paper base. By combining a paper base with a tear strength between 200 N and 1800 N with high strength biaxially oriented sheets, as disclosed in U.S. Pat. No. 5,866,282 (Bourdelais et al.), the tear resistance of the imaging element is further improved. For an imaging support material consisting of high strength biaxially oriented polymer sheets laminated to cellulose paper, a base paper with a tear resistance between 200 N and 1800 N improves the flexibility of the design by allowing, lower cost materials compared to polymer sheets to be utilized and still maintain the desirable tear resistance of the imaging element.

The terms as used herein, "top", "upper", "emulsion side", and "face" mean the side or toward the side of a imaging member bearing the imaging layers or formed image. The terms "bottom", "lower side", and "back" mean the side or toward the side of the photographic member opposite from the side bearing the imaging layers or developed image. The term "face side" means the side opposite the side of cellulose paper formed on a Fourdrinier wire. The term "wire side" mean the side of cellulose paper formed adjacent to the Fourdrinier wire.

The strong base material of the invention may be utilized in any of several imaging base materials. In photographic imaging, it is known to provide at least one layer of waterproofing resin onto each side of a base paper in order to provide waterproofing. These layers generally are of polyethylene and may contain tinting materials. It is also known in the art to provide biaxially oriented polyolefin sheets that are laminated to each side of the base paper to provide waterproofing, as well as image quality improvements. Further, if the base paper of the invention is utilized in other imaging systems such as thermal imaging or ink jet, it also will have a waterproofing layer applied, as well as an image receiving layer to aid in binding of the ink jet image or thermal image to the paper. The strong base paper of the invention is suitable for any of these imaging systems.

Any suitable biaxially oriented polyolefin sheet may be used for the sheet on the top side of the base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462 and 4,632,869.

The core of the preferred top composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

Percent solid density should be between 45% and 100%, preferably between 67% and 100%. As the percent solid density becomes less than 67%, the composite sheet becomes less manufacturable due to a drop in tensile strength. The sheet also becomes more susceptible to physical damage.

The total thickness of the top biaxially oriented composite sheet can range from 12 to 100 micrometers, preferably from 20 to 70 micrometers. Below 20 micrometers, the microvoided sheets may not be thick enough to minimize any inherent non-planarity in the support and would be more difficult to manufacture. At thickness higher than 70 micrometers, little improvement in either surface smoothness or mechanical properties are seen, and so there is little justification for further increase in cost for extra materials.

The top biaxially oriented sheets preferably have a water vapor permeability that is less than $0.85\times10^{-5}$ g/mm$^2$/day/atm. This allows faster emulsion hardening, as the laminated support of this invention greatly slows the rate of water vapor transmission from the emulsion layers during coating of the emulsions on the support. The transmission rate is measured by ASTM F1249.

"Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=$CH_2$, wherein Ar represents an aromatic hydrocarbon radical, or an aromatic halohydrocarbon radical of the benzene series and R is hydrogen or the methyl radical; acrylate-type monomers include monomers of the formula $CH_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important parameter is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefin polymers.

Suitable polyolefin polymers for the biaxially oriented sheet on the top side toward the emulsion include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers for the biaxially oriented sheet on the top side toward the emulsion can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Addenda may be added to the core matrix and/or to the skins of the top biaxially oriented sheet to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet. For photographic use, a white base with a slight bluish tint is preferred.

The coextrusion, quenching, orienting, and heat setting for the biaxially oriented sheet on the top side toward the emulsion may be affected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet for the biaxially oriented sheet on the top side toward the emulsion, while described as having preferably at least the three layers comprising a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide improved adhesion, or appearance to the support and photographic element. The biaxially oriented extrusion could be carried out with as many as 10 layers if desired to achieve some particular desired property.

The composite sheets for the biaxially oriented sheet on the top side toward the emulsion may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability and coating polyvinylidene chloride for heat seal properties. Further examples include flame, plasma or corona discharge treatment to improve printability or adhesion.

By having at least one nonvoided skin on the microvoided core, the tensile strength of the sheet is increased thus making the sheet more manufacturable. It also allows the sheets to be made at wider widths and higher draw ratios than when sheets are made with all layers voided. Coextruding the layers further simplifies the manufacturing process.

The structure of a preferred top biaxially oriented sheet of the invention where the exposed surface layer is adjacent to the imaging layer is as follows:

Polyethylene exposed surface layer with blue tint, red tint and a fluoropolymer

Polypropylene layer containing 24% anatase $TiO_2$, optical brightener and Hindered amine light stablizers (HALS)

Polypropylene microvoided layer with 0.65 grams per cubic cm density

Polypropylene layer with 24% anatase $TiO_2$ and HALS

Polyethylene bottom layer

The sheet on the side of the base paper opposite to the emulsion layers may be any suitable biaxially oriented polymer sheet. The sheet may or may not be microvoided. It may have the same composition as the sheet on the top side of the paper backing material. Bottom biaxially oriented sheets are conveniently manufactured by coextrusion of the sheet, which may contain several layers, followed by biaxial orientation. Such biaxially oriented sheets arc disclosed in, for example, U.S. Pat. No. 4,764,425, the disclosure of which is incorporated for reference.

Suitable classes of thermoplastic polymers for the bottom biaxially oriented sheet core and skin layers include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins for the core and skin layers of the bottom biaxially oriented polymer sheet include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters for the bottom oriented sheet include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. No. 2,465,319 and U.S. Pat. No. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly (ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the back side of the laminated base can be made with one or more layers of the same polymeric material, or it can be made with layers of different polymeric composition. In the case of a multiple layer system, when different polymeric materials are used, an additional layer may be required to promote adhesion between non-compatable polymeric materials so that the biaxially oriented sheets do not have layer fracture during manufacturing or in the final imaging element format.

The coextrusion, quenching, orienting, and heat setting of bottom biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

The surface roughness of bottom biaxially oriented sheet or $R_a$ is a measure of relatively finely spaced surface irregularities such as those produced on the back side of photographic materials by the casting of polyethylene against a rough chilled roll. The surface roughness measurement is a measure of the maximum allowable roughness expressed in units of micrometers and by use of the symbol $R_a$. For the irregular profile of the back side of photographic materials of this invention, the roughness average, $R_a$, is the sum of the absolute value of the difference of each discrete data point from the average of all the data divided by the total number of points sampled.

Biaxially oriented polyolefin sheets commonly used in the packaging industry are commonly melt extruded and then orientated in both directions (machine direction and cross direction) to give the sheet desired mechanical strength properties. The process of biaxially orientation generally creates a surface roughness average of less than 0.23 micrometers. While a smooth surface has value in the packaging industry, use as a back side layer for photographic paper is limited. Laminated to the back side of the base paper, the biaxially oriented sheet must have a surface roughness average ($R_a$) greater than 0.30 micrometers to ensure efficient transport through the many types of photofinishing equipment that have been purchased and installed around the world. At surface roughness less that 0.30 micrometers, transport through the photofinishing equipment becomes less efficient. At surface roughness greater than 2.54 micrometers, the surface would become too rough causing transport problems in photofinishing equipment and the rough back side surface would begin to emboss the silver halide emulsion as the material is wound in rolls.

The structure of a preferred backside biaxially oriented sheet of this invention wherein the skin layer is on the bottom of the photographic element is as follows:

Polyester

Mixture of polypropylenes and a terpolymer of ethylene-propylene-butylene

Styrene butadiene methacrylate coating

Addenda may also be added to the biaxially oriented back side sheet to improve the whiteness of these sheets. This would include processes known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet.

In order to successfully transport a photographic paper that contains a laminated biaxially oriented sheet with the desired surface roughness, on the opposite side of the image layer an antistatic coating on the bottom most layer is preferred. The antistat coating may contain any known materials known in the art which are coated on photographic web materials to reduce static during the transport of photographic paper. The preferred surface resistivity of the antistat coat at 50% RH is less than $10^{-12}$ ohm/square.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability and coating polyvinylidene chloride for heat seal properties. Further examples include flame, plasma or corona discharge treatment to improve printability or adhesion.

In one embodiment of the invention, strong photographic grade cellulose papers of the invention are utilized as a base for laminating biaxially oriented polyolefin sheets. In the case of silver halide photographic systems, suitable cellulose papers must not interact with the light sensitive emulsion layer. The strong cellulose paper used in this invention must be "smooth" as to not interfere with the viewing of images. The surface roughness of cellulose paper or $R_a$ is a measure of relatively finely spaced surface irregularities on the paper. The surface roughness measurement is a measure of the maximum allowable roughness height expressed in units of micrometers and by use of the symbol $R_a$. For the paper of this invention, long wave length surface roughness or orange peel is of interest. For the irregular surface profile of the paper of this invention, a 0.95 cm diameter probe is used to measure the surface roughness of the paper and thus bridges all fine roughness detail. A preferred long wave length surface roughness of the paper is between 0.13 and 0.44 micrometers. At surface roughness greater than 0.44 micrometers, little improvement in image quality is observed when compared to current photographic papers. A cellulose paper surface roughness less than 0.13 micrometers is difficult to manufacture and costly.

For a glossy image a base with a surface roughness of between 0.30 and 0.95 $\mu$m at a spatial frequency of between 200 cycles/mm and 1300 cycles/mm is preferred. Below 0.25 micrometers, a smooth surface is difficult to produce using cellulose fiber. Above 1.05 micrometers, there is little improvement over the current art. The surface roughness for spatial frequency of between 200 cycles/mm and 1300 cycles/mm can be measured by TAYLOR-HOBSON Surtronic 3 with 2 micrometers diameter ball tip. The output Ra or "roughness average" from the TAYLOR-HOBSON is in units of micrometers and has a built in cut off filter to reject all sizes above 0.25 mm.

A preferred basis weight of the strong cellulose paper is between 117.0 and 195.0 g/m$^2$. A basis weight less than 117.0 g/m$^2$ yields a imaging support that does not have the required stiffness for transport through photofinishing equipment and digital printing hardware. Additionally, a basis weight less than 117.0 g/m$^2$ yields a imaging support that does not have the required stiffness for consumer acceptance. At basis weights greater than 195.0 g/m$^2$, the imaging support stiffness, while acceptable to consumers, exceeds the stiffness requirement for efficient photofinishing. Problems such as the inability to be chopped and incomplete punches are common with a cellulose paper that exceeds 195.0 g/m$^2$ in basis weight. The preferred fiber length of the paper of this invention is between 0.35 and 0.55 mm. Fiber Lengths are measured using a FS-200 Fiber Length Analyzer (Kajaani Automation Inc.). Fiber lengths less than 0.30 mm are difficult to achieve in manufacturing and as a result expensive. Because shorter fiber lengths generally result in an increase in paper modulus, paper fiber lengths less than 0.30 mm will result in a photographic paper this is very difficult to punch in photofinishing equipment. Paper fiber lengths greater than 0.62 mm do not show an improvement in surface smoothness The preferred density of the strong cellulose paper of this invention is between 1.05 and 1.20 g/cc. A sheet density less than 1.05 g/cc would not provide the smooth surface preferred by consumers. A sheet density that is greater than 1.20 g/cc would be difficult to manufacture requiring expensive calendering and a loss in machine efficiency.

The machine direction to cross direction modulus of the tough base paper is critical to the quality of a biaxially oriented imaging support as the modulus ratio is a controlling factor in imaging element curl and a balanced stiffness in both the machine and cross directions. The preferred machine direction to cross direction modulus ratio of the base paper utilized in a laminated support is between 1.4 and 1.9. A modulus ratio of less than 1.4 is difficult to manufacture since the cellulose fibers tend to align primarily with the stock flow exiting the paper machine head box. This flow is in the machine direction and is only counteracted slightly by fourdrinier parameters. A modulus ratio greater than 1.9 does not provide the desired curl and stiffness improvements to the laminated imaging support.

A tough cellulose paper that contains $TiO_2$ is preferred as the opacity of the imaging support can be improved by the use of $TiO_2$ in the cellulose paper. The tough cellulose paper of this invention may also contain any addenda known in the art to improve the imaging quality of the paper. The $TiO_2$ used may be either anatase or rutile type. Examples of $TiO_2$ that are acceptable for addition of cellulose paper are Dupont Chemical Co. R101 rutile $TiO_2$ and DuPont Chemical Co. R104 rutile $TiO_2$. Other pigments to improve photographic responses may also be used in this invention, pigments such as talc, kaolin, $CaCO_3$, $BaSO_4$, ZnO, $TiO_2$, ZnS, and $MgCO_3$ are useful and may be used alone or in combination with $TiO_2$.

Any pulps known in the art to provide image quality paper may be used in this invention. Bleached hardwood chemical kraft pulp is preferred as it provides brightness, a good starting surface and good formation while maintaining strength. In general, hardwood fibers are much shorter than softwood by approximately a 1:3 ratio. Pulp with a brightness less than 90% Brightness at 457 nm is preferred. Pulps with brightness of 90% or greater are commonly used in imaging supports because consumers typically prefer a white paper appearance. A tough cellulose paper less than 90% Brightness at 457 nm is preferred as the whiteness of the imaging support can be improved by laminating a microvoided biaxially oriented sheet to the cellulose paper of this invention. The reduction in brightness of the pulp allows for a reduction in the amount of bleaching required thus lowering the cost of the pulp and reducing the bleaching load on the environment.

The strong cellulose paper of this invention can be made on a standard continuous Fourdrinier wire machine. For the formation of strong cellulose paper of this invention, it is necessary to refine the paper fibers to a high degree to obtain good formation. This is accomplished in this invention by providing wood fibers suspended in water bringing said fibers into contact with a series of disc refining mixers and conical refining mixers such that fiber development in disc refining is carried out at a total specific net refining power of 44 to 66 KW hrs/metric ton and cutting in the conical mixers is carried out at a total specific net refining power of between 55 and 88 KW hrs/metric ton, applying said fibers in water to a foraminous member to remove water, drying tough paper between press and felt, drying tough paper between cans, applying a size to said paper, drying said paper between steam heated dryer cans, applying steam to said paper, and passing said paper through calender rolls. The preferred specific net refining power (SNRP) of cutting is between 66 and 77 KW hrs/metric ton. A SNRP of less than 66 KW hrs/metric ton will provide an inadequate fiber length reduction resulting in a less smooth surface. A SNRP of greater than 77 KW hrs/metric ton after disc refining described above generates a stock slurry that is difficult to drain from the fourdrinier wire.

For the formation of tough cellulose paper of sufficient smoothness, it is desirable to rewet the paper surface prior final calendering. Papers made on the paper machine with a high moisture content calendar much more readily that papers of the same moisture content containing water added in a remoistening operation. This is due to a partial irreversibility in the imbition of water by cellulose. However, calendering a paper with high moisture content results blackening, a condition of transparency resulting from fibers being crushed in contact with each other. The crushed areas reflect less light and therefore appear dark, a condition that is undesirable in an imaging application such as a base for color paper. By adding moisture to the surface of the paper after the paper has been machine dried the problem of blackening can be avoided while preserving the advantages of high moisture calendering. The addition of surface moisture prior to machine calendering is intended to soften the surface fibers and not the fibers in the interior of the paper. Papers calendered with a high surface moisture content generally show greater strength, density, gloss and processing chemistry resistance, all of which are desirable for an imaging support and have been shown to be perceptually preferred to prior art photographic paper bases.

There are several paper surface humidification/moisturization techniques. The application of water either by mechanical roller or aerosol mist by way of a electrostatic field, are two techniques known in the art. The above techniques require dwell time, hence web length, for the water to penetrate the surface and equalize in the top surface of the paper. Therefore it is difficult for these above systems to make moisture corrections without distorting, spotting and swelling of the paper. The preferred method to rewet the paper surface prior final calendering is by use of a steam application device. A steam application device uses saturated steam in a controlled atmosphere to cause water vapor to penetrate the surface of the paper and condense. Prior to calendering, the steam application device allows a considerable improvement in gloss and smoothness due to the heating up and moisturizing the paper of this invention before the pressure nip of the calendering rolls. An example of a commercially available system that allows for controlled steam moisturization of the surface of cellulose paper is the "Fluidex System" manufacture by Pagendarm Corp.

The preferred moisture content of the tough cellulose paper by weight after applying the steam and calendering is between 7% and 9%. A moisture level less than 7% is more costly to manufacture since more fiber is needed to reach a final basis weight. At a moisture level greater than 10% the surface of the paper begins to degrade. After the steam rewetting of the paper surface, the paper is calendered before winding of the paper. The preferred temperature of the calender rolls is between 76° C. and 88° C. Lower temperatures result in a poor surface. Higher temperatures are unnecessary as they do not improve the paper surface and require more energy.

A preferred layered structure for the tough cellulose paper is a three layer structure in which softwood kraft fibers are in the middle layer and hardwood fibers are on the outside layers. This structure is preferred as the cellulose fibers in middle layer can be long to increase the tear resistance of the tough cellulose paper and the outside layers of the three layer structure can contain fibers that are short enough to provide the surface smoothness required for high quality photographic images. The multi layered tough paper can be manufactured using a multi manifold head box with two or more distinct fiber slurries. A preferred structure of a multi layered cellulose paper is as follows:

Hardwood fiber with a average length of 0.45 mm
Softwood kraft fiber with a average length of 0.95 mm
Hardwood fiber with a average length of 0.50 mm The Technical Association of the Pulp and Paper Industry literature suggests that the MD to CD modulus ratio predicts manufacturing efficiency in conversion processes, optimization of paper bending stiffness, monitors paper making "draws" and the "jet/wire" ratio. An MSA (major strength angle) of a paper web or biaxially oriented polymer sheets is defined as the angle from the machine direction where the modulus of the paper web or biaxially oriented sheet is at its maximum. For example, a paper web with an MSA of 0 degrees has its modulus maximum aligned with the machine direction. A biaxially oriented polymer sheet with a MSA of 10 degrees has its modulus maximum 10 degrees away from the machine direction. The Technical Association of the Pulp and Paper Industry literature suggests that an MSA outside plus or minus 3 degrees is a leading indicator of "stack lean", dimensional stability, mis registration in printing due to differences in hygroexpansion, baggy edges and wrinkles. A MSA outside 5 degrees indicates that the paper making headbox is out of tune.

Stiffness in the plane of a sheet can be obtained from a Lorentzen & Wettre TSO gauge. This device can draw a polar plot of stiffness and it is also capable of estimating the major strength angle (MSA) by using sonic waves traveling though a sample in different directions. The sample may be analyzed repeatedly in a MD or CD pattern to map out the range of variation in the MD/CD profile and MSA.

In the absence of a TSO gauge, a tensile test can be done on a group of samples cut at angles from the MD to obtain the polar values. It is necessary take a large number of samples to be sure that the proper curve shape is obtained. The polar strength of a material can be modeled by the von Mises multimodal distribution equation below:

$$f(A, K, \Theta, \mu) := \frac{A}{\pi \cdot JO(K)} \cdot e^{K \cdot \cos(\Theta\_\mu)^2}$$

The parameter A is used to scale the size of the ellipsoid, K is a shape factor used in the term JO(K) which is a Bessel function of the first kind and zero order, Θ is the angle at which the strength is indicated, and $\mu$ is the MSA or major axis offset angle.

For assembled laminates, the polar stiffness data may either be elastic modulus readings or bending stiffness data. The bending stiffness of the sheet can be measured by using the LORENTZEN & WETTRE STIFFNESS TESTER, MODEL 16D. The output from this instrument is the force, in millinewtons, required to bend the cantilevered, unclamped end of a clamped sample 20 mm long and 38.1 mm wide at an angle of 15 degrees from the unloaded position. A typical range of stiffness that is suitable for photographic prints is 120 to 300 millinewtons. A stiffness greater than at least 120 millinewtons is required as the imaging support begins to loose commercial value below that number. Further, imaging supports with stiffness less than 120 millinewtons are difficult to transport in photographic finishing equipment or ink jet printers causing undesirable jams during transport. Supports with an MD stiffness greater than 280 millinewtons will also require too much force to transport a print around some metal guides because the coefficient of friction times the bending force is too high.

To better manage the curl of the photographic paper, replacing the low strength cast polyethylene layers with high strength biaxially oriented polymer sheets is useful. High strength plastic sheets are commonly made by biaxially orienting coextrusion cast thick (1025 micrometers) polyolefin polymers. The sheets in question may be labeled OPP for oriented polypropylene. Biaxially oriented polymer sheets are typically oriented 5× in the MD and then 8× in the CD. The final major strength properties are aligned with the CD and they are 1.8 times that of the MD. The MSA for biaxially oriented sheets can be aligned out of the exact CD direction by 10 degrees or more. For most purposes, a biaxially oriented sheet aligned out of the exact CD direction by 10 degrees or more is of no consequence. An MSA of 10 degrees or more is believed to be related to orientation of the polymer in the CD and then MD directions.

For a laminated imaging support material it has been found previously that to minimize curl in an imaging support material, the elastic modulus for high strength biaxially oriented polymer sheets should be the same order of magnitude as the cellulose paper base. High modulus biaxially oriented sheets therefore are superior to the weak polyethylene layers coated on prior art support materials. It has also been found that the primary strength axis for the biaxially oriented sheets should be approximately perpendicular to the cellulose paper base because it is possible to select combinations biaxially oriented sheets adhered to the cellulose paper base to obtain a combined bending stiffness that is equal in the MD and CD direction. It has been previously found that equal bending stiffness in the MD and CD tends to minimize image curl.

For a laminated imaging support it has been found that the condition of equal MD and CD strength is not, in itself, sufficient to keep a laminate from having optimum curling properties. Imaging supports made by laminating biaxially oriented sheets to cellulose paper and having a combined bending stiffness that is equal in the MD and CD direction have been shown to have "diagonal curl" which is curl where the axis of the cylinder of curvature is at an angle between the CD and MD. Diagonal curl, also known as "twist warp" makes the photographic print appear undesirable because the diagonal direction maximizes the total edge lift when the sample is laid on a table and the curl occurs along the line of maximum photo length. Perceptual testing showed that consumers seem to dislike the diagonal curl, even with small amounts of curl. A TSO angle for the tough cellulose paper between –5 and 5 degrees is preferred as this range of TSO has been shown to provide perceptually acceptable twist warp in images.

The bending stiffness of the tough cellulose paper base is measured by using the Lorentzen and Wettre stiffness tester, Model 16D. The output from this instrument is force, in millinewtons, required to bend the cantilevered, unclasped end of a sample 20 mm long and 38.1 mm wide at an angle of 15 degrees from the unloaded position. The preferred stiffness for the paper base is greater than 120 millinewtons. Below 1 10 millinewtons, the imaging element becomes less efficient as the image element is transported through digital printing equipment and photographic processing equipment. Further, below 100 millinewtons, the stiffness of the imaging element becomes perceptually undesirable.

The opacity of the tough cellulose base paper preferably is greater than 85. Opacity is measured using a Spectrogard spectrophotometer, CIE system, using illuminant D6500. Below 80 opacity, the cellulose paper base does not provide sufficient opacity to prevent undesirable show through as the image is viewed. An opacity of 100 would eliminate viewing show through and would allow higher density manufacturer branding information to be printed on the tough paper.

Tear resistance or tear strength for the strong cellulose base paper of the invention is the moment of force required to start a tear along an edge of the base paper. Higher tear resistance is typically associated with a high quality image material. The tear resistance test used was originally proposed by G. G. Gray and K. G. Dash, Tappi Journal 57, pages 167–170 published in 1974. The tear resistance for the photographic elements is determined by the tensile strength and the stretch of the photographic element. A 15 mm×25mm sample is looped around a metal cylinder with a 2.5 cm diameter. The two ends of the sample are clamped by a Instron tensile tester. A load is applied to the sample at a rate of 2.5 cm per minute until a tear is observed at which time the load, expressed in N, is recorded.

There are a number of noncellulosic fibers which can be utilized to produce tough paper. The preferred noncellulosic fibers are synthetic resin fibers, glass fibers, and asbestos. The difference between noncellulose fibers and cellulose fibers is that the former do not disperse well in water and do not bond naturally to form a sheet of paper. Bonding agents are generally used in this invention with synthetic fibers to improve bonding, and with some fibers, combinations of binders are essential. Noncellulose blends with cellulose fibers are preferred to improve wet-web strength, as well as formation and dry strength. The amount of cellulose fiber necessary to obtain wet-web strength varies with the synthetic fiber. For example, 5% cellulosic fiber is enough with Dynel, but up to 25% is required with polyethylene fiber.

Noncellulose fibers or synthetic fibers are preferably bonded to the cellulose paper after aqueous felting to increase the tear resistance of the imaging element. The preferred methods methods used for bonding nonwoven fabrics to improve the tear resistance of a cellulose photographic paper base are:

Solvent bonding—Solvent or swelling agent added to gelatinize the fibers which are then bonded by pressure.

Thermoplastic fibers—These are added as a fiber blend, followed by heat to bond these fibers into the web.

Thermoplastic powder—Fine particles (0.002 to 0.005 in.) are sifted into the web. These penetrate by gravity and are bonded at fiber intersections by heat. About 15 to 30% binder is used.

Printing—Thickened binder (e.g., plasticized polyvinyl acetate) is applied cross-wise to the thin web.

Saturation—A fluid solution or dispersion of resin is applied to the web. From 15 to 50% binder is used to provide a very high degree of bonding.

Spraying—Resin is applied more or less to the surface of the web.

Foaming—A foamed mixture of binder, emulsifier, foaming agent, and thickener is applied to the web and squeezed into it by squeeze rolls.

Tear resistant papers can be made with a wide range of physical and chemical properties from synthetic resin fibers blended with ordinary cellulose fibers. Nylon, Orion, Dacron, and Vinyl resin fibers are preferred. At present because most synthetic fibers sell at over ten times the price of cellulose fibers, blending low cost cellulose fibers with synthetic fibers also is low in cost compared to a 100% synthetic fiber paper. Because synthetic resin fibers are typically hydrophobic and are difficult to disperse in water. They require a special finish or the use of a dispersing agent. A preferred dispersing agent is CMC added between 0.05% and 0.30%, to make them the synthetic fibers dispersible in water. Resin latex may be added as a binder with the fiber and wood pulp fibers or a pick-up felt may be used between the couch roll and the drier felt to eliminate the gap over which the sheet must pass to overcome any problems with wet web strength that may result from the introduction of synthetic paper fibers.

To obtain satisfactory dry strength, special bonding techniques must be used, as described above. The most important are by (1) synthetic polymer bonding, (2) thermoplastic fiber bonding and, (3) solvent bonding. In the first method, the partially dried sheet is impregnated with a resin dissolved in an organic solvent or dispersed in water. Optimum tearing resistance is obtained at 18 to 20% resin addition , whereas tensile and bursting strength tends to level off at binder levels above 30%. In the second technique, a portion of a thermoplastic fiber of low melting point is used. Bonding is then accomplished by hot pressing or calendering of the sheet. By incorporating 15 to 25% of vinyl resin fiber in the regular fiber furnish, special heat seal papers can be produced which have a special use for tea bags, filter papers, packaging, etc. The strong paper is said to heat seal at 115 to 130 degrees Celsius at a pressure of 40 N to 70 N. It is widely known that sheets made of 100% Dynel (a copolymer of vinyl acetate and acrylonitrile) can be bonded by dry calendering at 200° C. with a nip pressure of several hundred pounds per lineal inch. About 5% of a high boiling solvent, e.g., propylene carbonate, is necessary to obtain bonding at high calendering speeds. The water in the solvent evaporates at the temperature of calendering which leaves a high concentration of the solvent on the surface of the fibers, thereby tackifying the fibers and promoting bonding. One preferred technique of solvent bonding depends on the use of concentrated aqueous salt solutions to impregnate and partially dissolve a small portion of the fiber surface. One variation of fiber bonding is special polyvinyl alcohol “binder fibers,” which are cold water swelling and hot water soluble, are used. When the tough paper is heated, the “binder fibers” dissolve and act as the bonding agent. In addition to the “binder-fibers,” dispersing agents such as polyacrylic acid are added to maintain a uniform dispersion.

A matrix polymer or a polymer added to the cellulose paper sheet prior to final calendering preferably is a polymer that can be cured with ultraviolet energy. UV cure polymers are preferred since they can be added to the sheet and cured at manufacturing machine speeds without a loss in efficiency. UV cure polymers have also been shown to improve the tear resistance of the cellulose paper. Preferred UV cure polymers include aliphatic urethane, allyl methacrylate, ethylene glycol dimethacrylate, polyisocyanate and hydroxyethyl methacrylate. A preferred photoinitiator is benzil dimethyl ketal. The preferred intensity of radiation is between 0.1 and 1.5 milliwatt/$cm^2$. Below 0.05, insufficient cross linking occurs yielding little improvement in tear resistance.

The surface of the cellulose paper is preferably treated with water soluble polymers to increase the toughness of the cellulose paper prior to final calendering and after stripping from the wire. Preferred materials include polyvinyl alcohol, ethylene oxide polymers, polyvinyl pyrrolidone and polyethyleneimine. The rate of water soluble penetration into the cellulose fiber matrix depends on the percent moisture, apparent density and percent solids of the water soluble polymer. Application methods include dip coating, roll coating and blade coating.

In blends of synthetic fiber and wood pulp fiber the presence of the synthetic fibers greatly increases the tearing resistance and folding strength. Small percentages of synthetic fiber decrease the tensile and bursting strengths, but larger portions increase these strength properties also. Papers having tearing resistance ten times higher than typical kraft papers can be obtained. The dimensional stability of the paper is also improved through the addition of synthetic fibers, best results being obtained when the fiber length is great enough to restrain shrinkage during drying. The best dimensional stability with a mixture of polyester and cellulose fibers. When a binder is used in the blend, exceptional dimensional stability can be obtained as in a blend of 40% synthetic fiber and 40% rag fiber bound with 20% acrylic resin binder. Another interesting property of papers made from blends of synthetic and wood fibers is high water absorption, both rate of water absorption and total amount of water absorbed. This feature is especially useful for ink jet reflective paper. For example, the inclusion of 25% of a synthetic fiber (Dynel) in a sulfite furnish increases the absorbency by 100%. The increased absorbency is due to the hydrophobic nature of the synthetic fibers which reduces bonding and creates capillaries that remain open and free to absorb liquids. It has been discovered that a mixture of fiber lengths ranging from 0.25 cm to 1.0 cm gives the best all around results in ease of fiber dispersion, sheet formation, and sheet strength.

A cellulose base paper that contains at least 50% cellulose fiber is preferred as the cellulose fiber calenders well and provides an acceptable surface for the formation of images using a variety of imaging techniques such as silver halide imaging or ink jet printing. Further, since paper fiber is low in cost compared to synthetic fibers, to produce a low cost paper, the use of synthetic fibers must be optimized.

When blended with cellulose fibers, glass fibers have many properties which make them preferred for tough paper. They are inorganic, stable to heat and humidity, resistant to attack by microorganisms and most chemicals, and are nonconductors of electricity. Glass fibers used for making tough papers are generally microfibers produced from a special boro-silicate type glass by blowing or spinning. Because of their small size these fibers tend to remain suspended in water. Coarser glass fibers in the range of 5 to 10 micrometers in diameter can be used. They are cheaper than microfibers, but are limited to small percentages of the furnish. They tend to increase the tearing resistance of paper. Dimensions of glass fibers used in paper making are listed below.

Dimensions of Glass Microfibers Used in Tough Paper

| Letter designation | Average Fiber diameter, (micrometer) |
|---|---|
| B | 2.5–3.8 |
| A | 1.5–2.49 |
| AA | 0.75–1.49 |
| AAA | 0.5–0.749 |
| AAAA | 0.2–0.499 |
| AAAAA | 0.05–0.199 |

Glass fibers are much more brittle than cellulose fibers. Beating tends to break them and produce short fibers or fines which have a very deleterious effect on the strength of the final paper. Therefore the best papers are made from fibers having a diameter of 0.5 to 0.75 micrometers and a minimum of fines.

Beating of glass fibers must be done carefully and continued only long enough to open up and separate the fibers. Glass fibers do not fibrillate, and the major portion of the strength which is developed depends upon the mechanical entanglement with the cellulose fibers and frictional resistance of the glass fibers in the final paper. Low pH during beating of glass fibers tends to improve strength. By beating at a temperature of 22 degrees C. and adjusting the pH of the glass-water mixture to about 3.5 with sulfuric acid, it is possible to make a tremendous improvement in the strength of the final paper. It is believed that the acid dissolves the alkali in the glass, leaving a thing gelatinous layer, rich in silica, on the surface of the fibers. The acid dissolved material is drained off during sheet formation, so that the finished paper has a pH of 7.0 to 7.4.

When made without binder, glass papers from microfibers are typically soft, absorbent, and flexible. The density is generally between 0.25 and 0.30 g/cc. The paper shows a strength increase up to about 22% solids resulting from surface tension effects, but a decrease in strength occurs at higher solids because of a lack of fiber bonding. When mixed with wood fibers, glass fibers tend to reduce burst and tensile strength, to increase porosity, and to increase wet tensile and tear strength. The use of 5% glass fibers reduces the hygroexpansivity of glass fiber cellulose fiber paper 35%, by reducing shrinkage of the paper during drying. The use of glass fibers also results in a more "square' sheet as a result of more uniform shrinkage across the width of the web. Papers containing glass fibers generally require more draw on the machine and are wider at the dry end than normal paper made without glass fibers. Because glass fibers increase wet-web strength and increase the drying rate, they make possible higher machine speeds.

When using a tear resistant cellulose fiber paper support in combination with high strength biaxially oriented sheets, it is preferable to extrusion laminate the microvoided composite sheets to the base paper using a polyolefin resin. Extrusion laminating is carried out by bringing together the biaxially oriented sheets of the invention and the tough base paper with application of an adhesive between them followed by their being pressed in a nip such as between two rollers. The adhesive may be applied to either the biaxially oriented sheets or the tough paper prior to their being brought into the nip. In a preferred form the adhesive is applied into the nip simultaneously with the biaxially oriented sheets and the tough paper. The adhesive may be any suitable material that does not have a harmful effect upon the photographic element. A preferred material is polyethylene that is melted at the time it is placed into the nip between the paper and the biaxially oriented sheet.

During the lamination process, it is desirable to maintain control of the tension of the biaxially oriented sheet(s) in order to minimize curl in the resulting laminated support. For high humidity applications (>50% RH) and low humidity applications (<20% RH), it is desirable to laminate both a front side and back side film to keep curl to a minimum. Also, during the lamination process, it is desirable to laminate the top sheet to the face side of the paper. Generally, the face side of the paper is a smoother surface than the wire side. Lamination of the top sheet to the face side of the paper will generally yield a image with better gloss than lamination of the top sheet to the wire side of the paper. The top sheet may also be laminated to the wire side of the paper to minimize stock rupture of the base paper.

In another embodiment of the invention, the tough base paper of the invention is melt cast extrusion laminated with at least one polyolefin waterproof layer to protect the tough cellulose paper during image development. The reflective support of the present invention preferably includes a resin layer with a stabilizing amount of hindered amine extruded on the top side of the imaging layer substrate. Hindered amine light stabilizers (HALS) originate from 2,2,6,6-tertramethylpiperidine. The hindered amine should be added to the polymer layer at about 0.01–5% by weight of said resin layer in order to provide resistance to polymer degradation upon exposure to UV light. The preferred amount is at about 0.05–3% by weight. This provides excellent polymer stability and resistance to cracking and yellowing while keeping the expense of the hindered amine to a minimum. Examples of suitable hindered amines with molecular weights of less than 2300 are Bis(2,2,6,6-letramethyl-4-piperidinyl)sebacate; Bis(1,2,2,6,6-pentamethyl-4-piperidinyl)sebacate; Bis(1,2,2,6,6-pentamethyl-4-piperidinyl)2-n-butyl-(3,5-di-tert-butyl-hydroxybenzyl) malonate; 8-Acetly-3-dodecyl-7,7,9,9-tetramethly- 1.3,8-triazaspirol(4,5)decane-2,4-dione; Tetra(2,2,6,6-tetramethyl-4-piperidinyl)1,2,3,4-butanetetracarboxylate; 1-(-2-[3,5-di-tert-butyl-4-hydroxyphenylpropionyloxyl] ethyl)-4-(3,5-di-tert-butyl-4-hydroxyphenylpropionyloxy)-2,2,6,6-tetramethylpiperidine; 1,1'-(1,2-ethenadiyl)bis(3,3,5,5-tetramethyl-2-piperazinone); The preferred hindered amine is 1,3,5-triazine-2,4,6-triamine,N,N'"-[1,2-ethanediylbis[[[4,6-bis(butyl(1,2,2,6,6-pentamethyl-4-piperidinyl)amino]-1,3,5-triazine-2-yl]imino]-3,1 propanediyl]]-bis[N',N"-dibutyl-N',N"-bis(1,2,2,6,6-pentamethyl-4-piperidinyl) which will be referred to as Compound A. Compound A is preferred because when mixtures of polymers and Compound A are extruded onto imaging paper the polymer to paper adhesion is excellent and the long term stability of the imaging system against cracking and yellowing is improved.

Preferred polymers for the melt extruded waterproof layer include polyethylene, polypropylene, polymethylpentene, polystyrene, polybutylene, and mixtures thereof. Polyolefin copolymers, including copolymers of polyethylene, propylene and ethylene such as hexene, butene, and octene are also useful. Polyethylene is most preferred, as it is low in cost and has desirable coating properties. As polyethylene, usable are high-density polyethylene, low-density polyethylene, linear low density polyethylene, and polyethylene blends. Other suitable polymers include polyesters produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Other polymers are matrix polyesters having repeat units from terephthalic acid or naphthalene dicarboxylic acid and at least one glycol selected from ethylene glycol, 1,4-butanediol and 1,4-cyclohexanedimethanol such as poly(ethylene terephthalate), which may be modified by small amounts of other monomers. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607: 4,459,402; and 4,468,510. Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

Any suitable white pigment may be incorporated in the melt extruded polyolefin waterproof layer, such as, for example, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The preferred pigment is titanium dioxide because of its high refractive index, which gives excellent optical properties at a reasonable cost. The pigment is used in any form that is conveniently dispersed within the polyolefin. The preferred pigment is anatase titanium dioxide. The most preferred pigment is rutile titanium dioxide because it has the highest refractive index at the lowest cost. The average pigment diameter of the rutile $TiO_2$ is most preferably in the range of 0. 1 to 0.26 $\mu$m. The pigments that are greater than 0.26 $\mu$m are too yellow for an imaging element application and the pigments that are less than 0.1 $\mu$m are not sufficiently opaque when dispersed in polymers. Preferably, the white pigment should be employed in the range of from about 10 to about 50 percent by weight, based on the total weight of the polyolefin coating. Below 10 percent $TiO_2$, the imaging system will not be sufficiently opaque and will have inferior optical properties. Above 50 percent $TiO_2$, the polymer blend is not manufacturable. The surface of the $TiO_2$ can be treated with an inorganic compounds such as aluminum hydroxide, alumina with a fluoride compound or fluoride ions, silica with a fluoride compound or fluoride ion, silicon hydroxide, silicon dioxide, boron oxide, boria-modified silica (as described in U.S. Pat. No. 4,781,761), phosphates, zinc oxide, $ZrO_2$, etc. and with organic treatments such as polyhydric alcohol, polyhydric amine, metal soap, alkyl titanate, polysiloxanes, silanes, etc. The organic and inorganic $TiO_2$ treatments can be used alone or in any combination. The amount of the surface treating agents is preferably in the range of 0.2 to 2.0% for the inorganic treatment and 0.1 to 1% for the organic treatment, relative to the weight of the weight of the titanium dioxide. At these levels of treatment the $TiO_2$ disperses well in the polymer and does not interfere with the manufacture of the imaging support.

The melt extruded polyolefin waterproof polymer, hindered amine light stabilizer, and the $TiO_2$ are mixed with each other in the presence of a dispersing agent. Examples of dispersing agents are metal salts of higher fatty acids such as sodium palmitate, sodium stearate, calcium palmitate, sodium laurate, calcium stearate, aluminum stearate, magnesium stearate, zirconium ctylate, zinc stearate, etc, higher fatty acids, and higher fatty amide. The referred dispersing agent is sodium stearate and the most preferred dispersing agent is zinc stearate. Both of these dispersing agents give superior whiteness to the resin-coated layer.

For photographic use, a white base with a slight bluish tint is preferred. The layers of the melt extruded polyolefin waterproof layer coating preferably contain colorants such as a bluing agent and magenta or red pigment. Applicable bluing agents include commonly know ultramarine blue, cobalt blue, oxide cobalt phosphate, quinacridone pigments, and a mixture thereof. Applicable red or magenta colorants are quinacridones and ultramarines.

The melt extruded polyolefin waterproof layer may also include a fluorescing agent, which absorbs energy in the UV region and emit light largely in the blue region. Any of the optical brightener referred to in U.S. Pat. No. 3,260,715 or a combination thereof would be beneficial.

The melt extruded polyolefin waterproof layer may also contain an antioxidant(s) such as hindered phenol primary antioxidants used alone or in combination with secondary antioxidants. Examples of hindered phenol primary antioxidants include pentaerythrityl tetrakis [3-(3,5-di-tert-butyl-4-hydroxyphenyl)proprionate] (such as Irganox 1010), octadecyl 3-(3,5-di-tert-butyl-4-hydroxyphenyl)proprionate (such as Irganox 1076 which will be referred to as compound B), benzenepropanoic acid 3,5-bis(1,1-dimethyl)-4-hydroxy-2[3-[3,5-bis(1,1-dimethylethyl)-4-hydroxyphenyl)-1-oxopropyl)hydrazide (such as Irganox MD1024), 2,2'-thiodiethylenebis[3-(3,5-di-tert-butyl-4-hydroxyphenyl)proprionate] (such as Irganox 1035), 1,3,5-trimethyl-2,4,6-tri(3,5-di-tert-butyl-4-hydroxybenzyl) benzene (such as Irganox 1330), but are not limited to these examples. Secondary antioxidants include organic alkyl and aryl phosphites including examples such as triphenylphosphite (such as Irgastab TPP), tri(n-propylphenyl-phophite) (such as Irgastab SN-55), 2,4-bis(1,1-dimethylphenyl) phosphite (such as Irgafos 168).

The hindered amine light stabilizer, $TiO_2$, colorants, slip agents, optical brightener, and antioxidant are incorporated either together or separately with the polymer using a continuous or Banburry mixer. A concentrate of the additives in the form of a pellet is typically made. The concentration of the rutile pigment can be from 20% to 80% by weight of the masterbatch. The master batch is then adequately diluted for use with the resin.

To form the melt extruded polyolefin waterproof layer according to the present invention, the pellet containing the pigment and other additives is subjected to hot-melt coating onto a running support of paper or synthetic paper. If desired, the pellet is diluted with a polymer prior to hot melt coating. For a single layer coating the resin layer may be formed by lamination. The die is not limited to any specific type and may be any one of the common dies such as a T-slot or coat hanger die. An exit orifice temperature in heat melt extrusion of the melt extruded polyolefin waterproof layer ranges from 250 to 370° C. Further, before coating the support with resin, the support may be treated with an activating treatment such as corona discharge, flame, ozone, plasma, or glow discharge.

At least two melt extruded polymer layers applied to the top or bottom side of the tough paper is preferred. Two or more layers are preferred at different polymers systems can be used to improve image whiteness by using a higher weight percent of white pigments or by the use of a less expensive polymer located next to the base paper. The preferred method for melt extruding 2 or more layers is melt coextrusion from a slit die. Coextrusion is a process that provides for more than one extruder to simultaneously pump molten polymer out through a die in simultaneous yet discrete layers. This is accomplished typically through the use of a multimanifold feedblock which serves to collect the hot polymer keeping the layers separated until the entrance to the die where the discrete layers are pushed out between the sheet and paper to adhere them together. Coextrusion lamination is typically carried out by bringing together the biaxially oriented sheet and the base paper with application of the bonding agent between the base paper and the biaxially oriented sheet followed by their being pressed together in a nip such as between two rollers.

The thickness of the melt extruded polyolefin waterproof layer which is applied to a base paper of the reflective support used in the present invention at a side for imaging, is preferably in the range of 5 to 100 $\mu$m and most preferably in the range of 10 to 50 $\mu$m.

The thickness of the melt extruded polyolefin waterproof layer applied to a base paper on the side opposite the imaging element is preferably in a range from 5 to 100 $\mu$m and more preferably from 10 to 50 $\mu$m. The surface of the waterproof resin coating at the imaging side may be a glossy, fine, silk, grain, or matte surface. On the surface of the water-proof coating on the backside which is not coated with an imaging element may also be glossy, fine, silk, or matte surface. The preferred water-proof surface for the backside away from the imaging element is matte.

A melt extruded layer of polyester applied to the base paper is preferred as the melt extruded polyester provides mechanical toughness and tear resistance compared to typical melt extruded polyethylene. Further, a melt extruded layer of polyester is preferred as the weight percent of white pigment contained in polyester can be significantly increased compared to the weight percent of white pigment in polyolefin thus improving the whiteness of a polyester melt extruded imaging support material. Such polyester melt extruded layers are well known, widely used and typically prepared from high molecular weight polyesters prepared by condensing a dihydric alcohol with a dibasic saturated fatty acid or derivative thereof.

Suitable dihydric alcohols for use in preparing such polyesters are well known in the art and include any glycol wherein the hydroxyl groups are on the terminal carbon atom and contain from two to twelve carbon atoms such as, for example, ethylene glycol, propylene glycol, trimethylene glycol, hexamethylene glycol, decamethylene glycol, dodecamethylene glycol, 1,4-cyclohexane, dimethanol, and the like.

Suitable dibasic acids useful for the preparation of polyesters include those containing from two to sixteen carbon atoms such as adipic acid, sebacic acid, isophthalic acid, terephthalic acid, and the like. Alkyl esters of acids such as those listed above can also be employed. Other alcohols and acids as well as polyesters prepared therefrom and the preparation of the polyesters are described in U.S. Pat. Nos. 2,720,503 and 2,901,466. Polyethylene terephthalate is preferred.

Melt extrusion of the polyester layer to the base paper is preferred. The thickness of the polyester layer is preferably from 5 to 100 micrometers. Below 4 micrometers the polyester layer begins to loose waterproof properties needed to survive a wet image development process. Above 110 micrometers, the melt extruded polyester layer becomes brittle and will show undesirable cracks under the image layers.

As used herein the phrase "imaging element" is a material that may be used as a imaging support for the transfer of images to the support by techniques such as ink jet printing or thermal dye transfer as well as a support for silver halide images. As used herein, the phrase "photographic element" is a material that utilizes photosensitive silver halide in the formation of images. The thermal dye image-receiving layer of the receiving elements of the invention may comprise, for example, a polycarbonate, a polyurethane, a polyester, polyvinyl chloride, poly(styrene-co-acrylonitrile), poly (caprolactone) or mixtures thereof. The dye image-receiving layer may be present in any amount which is effective for the intended purpose. In general, good results have been obtained at a concentration of from about 1 to about 10 $g/m^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803 and 5,023,228.

As noted above, dye-donbr elements are used to form a dye transfer image. Such a process comprises image-wiseheating a dye-donor element and transferring a dye image to a dye-receiving element as described above to form the dye transfer image.

In a preferred embodiment of the thermal dye transfer method of printing , a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089 or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photorecptors.

In one form of the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created iono-graphically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent these toners form a film bonded to the paper. For heat-fusible toners, thermoplastic polymers are used as part of the particle. Heating both removes residual liquid and fixes the toner to paper.

The dye receiving layer or DRL for ink jet imaging may be applied by any known methods. Such as solvent coating, or melt extrusion coating techniques. The DRL is coated over the TL at a thickness ranging from 0.1–10 $\mu$m, preferably 0.5–5 $\mu$m. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al. in U.S. Pat. Nos. 4,879,166; 5,264,275; 5,104,730; 4,879,166, and Japanese patents 1,095,091; 2,276,671; 2,276,670; 4,267,180; 5,024,335; and 5,016,517 discloses aqueous based DRL formulations comprising mixtures of psuedo-bohemite and certain water soluble resins. Light, in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al. in U.S. Pat. Nos. 4,857,386 and 5,102,717 disclose ink-absorbent resin layers comprising mixtures of vinyl pyrrolidone polymers and acrylic or methacrylic polymers. Sato et al. in U.S. Pat. No. 5,194,317 and Higuma et al. in U.S. Pat. No. 5,059,983 disclose aqueous-coatable DRL formulations based on poly (vinyl alcohol). Iqbal, in U.S. Pat. No. 5,208,092, discloses water-based IRL formulations comprising vinyl copolymers which are subsequently cross-linked. In addition to these examples, there may be other known or contemplated DRL formulations which are consistent with the aforementioned primary and secondary requirements of the DFL, all of which fall under the spirit and scope of the current invention.

The preferred DRL is a 0.1–10 micrometers DRL which is coated as an aqueous dispersion of 5 parts alumoxane and 5 parts poly (vinyl pyrrolidone). The DRL may also contain varying levels and sizes of matting agents for the purpose of controlling gloss, friction, and/or finger print resistance, surfactants to enhance surface uniformity and to adjust the surface tension of the dried coating, mordanting agents, anti-oxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

This invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100$\mu$ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above.

This invention in a preferred embodiment utilizes a radiation-sensitive emulsion comprised of silver halide grains (a) containing greater than 50 mole percent chloride, based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula $$[ML_6]^n \qquad (I)$$

wherein n is zero, −1, −2, −3 or −4; M is a filled frontier orbital polyvalent metal ion, other than iridium; and $L_6$ represents bridging ligands which can be independently selected, provided that least four of the ligands are anionic ligands, and at least one of the ligands is a cyano ligand or a ligand more electronegative than a cyano ligand; and (ii) an iridium coordination complex containing a thiazole or substituted thiazole ligand.

This invention is directed towards a photographic recording element comprising a support and at least one light sensitive silver halide emulsion layer comprising silver halide grains as described above.

It has been discovered quite surprisingly that the combination of dopants (i) and (ii) provides greater reduction in reciprocity law failure than can be achieved with either dopant alone. Further, unexpectedly, the combination of dopants (i) and (ii) achieve reductions in reciprocity law failure beyond the simple additive sum achieved when employing either dopant class by itself. It has not been reported or suggested prior to this invention that the combination of dopants (i) and (ii) provides greater reduction in reciprocity law failure, particularly for high intensity and short duration exposures. The combination of dopants (i) and (ii) further unexpectedly achieves high intensity reciprocity with iridium at relatively low levels, and both high and low intensity reciprocity improvements even while using conventional gelatino-peptizer (e.g., other than low methionine gelatino-peptizer).

In a preferred practical application, the advantages of the invention can be transformed into increased throughput of digital substantially artifact-free color print images while exposing each pixel sequentially in synchronism with the digital data from an image processor.

In one embodiment, the present invention represents an improvement on the electronic printing method. Specifically, this invention in one embodiment is directed to an electronic printing method which comprises subjecting a radiation sensitive silver halide emulsion layer of a recording element to actinic radiation of at least $10^{-4}$ ergs/cm$^2$ for up to 100$\mu$ seconds duration in a pixel-by-pixel mode. The present invention realizes an improvement in reciprocity failure by selection of the radiation sensitive silver halide emulsion layer. While certain embodiments of the invention are specifically directed towards electronic printing, use of the emulsions and elements of the invention is not limited to such specific embodiment, and it is specifically contemplated that the emulsions and elements of the invention are also well suited for conventional optical printing.

It has been unexpectedly discovered that significantly improved reciprocity performance can be obtained for silver halide grains (a) containing greater than 50 mole percent chloride, based on silver, and (b) having greater than 50 percent of their surface area provided by {100} crystal faces by employing a hexacoordination complex dopant of class (i) in combination with an iridium complex dopant comprising a thiazole or substituted thiazole ligand. The reciprocity improvement is obtained for silver halide grains employing conventional gelatino-peptizer, unlike the contrast improvement described for the combination of dopants set forth in U.S. Pat. Nos. 5,783,373 and 5,783,378, which requires the use of low methionine gelatino-peptizers as discussed therein, and which states it is preferable to limit the concentration of any gelatino-peptizer with a methionine level of greater than 30 micromoles per gram to a concentration of less than 1 percent of the total peptizer employed. Accordingly, in specific embodiments of the invention, it is specifically contemplated to use significant levels (i.e., greater than 1 weight percent of total peptizer) of conventional gelatin (e.g., gelatin having at least 30 micromoles of methionine per gram) as a gelatino-peptizer for the silver halide grains of the emulsions of the invention. In preferred embodiments of the invention, gelatino-peptizer is employed which comprises at least 50 weight percent of gelatin containing at least 30 micromoles of methionine per gram, as it is frequently desirable to limit the level of oxidized low methionine gelatin which may be used for cost and certain performance reasons.

In a specific, preferred form of the invention it is contemplated to employ a class (i) hexacoordination complex dopant satisfying the formula:

$[ML_6]^n$ (I)

where n is zero, −1, −2, −3 or −4;

M is a filled frontier orbital polyvalent metal ion, other than iridium, preferably $Fe^{+2}$, $Ru^{+2}$, $Os^{+2}$, $Co^{+3}$, $Rh^{+3}$, $Pd^{+4}$ or $Pt^{+4}$, more preferably an iron, ruthenium or osmium ion, and most preferably a ruthenium ion;

$L_6$ represents six bridging ligands which can be independently selected, provided that least four of the ligands are anionic ligands and at least one (preferably at least 3 and optimally at least 4) of the ligands is a cyano ligand or a ligand more electronegative than a cyano ligand. Any remaining ligands can be selected from among various other bridging ligands, including aquo ligands, halide ligands (specifically, fluoride, chloride, bromide and iodide), cyanate ligands, thiocyanate ligands, selenocyanate ligands, tellurocyanate ligands, and azide ligands. Hexacoordinated transition metal complexes of class (i) which include six cyano ligands are specifically preferred.

Illustrations of specifically contemplated class (i) hexacoordination complexes for inclusion in the high chloride grains are provided by Olm et al U.S. Pat. No. 5,503,970 and Daubendiek et al U.S. Pat. Nos. 5,494,789 and 5,503,971, and Keevert et al U.S. Pat. No. 4,945,035, as well as Murakami et al Japanese Patent Application Hei-2[1990]-249588, and Research Disclosure Item 36736. Useful neutral and anionic organic ligands for class (ii) dopant hexacoordination complexes are disclosed by Olm et al U.S. Pat. No. 5,360,712 and Kuromoto et al U.S. Pat. No. 5,462,849.

Class (i) dopant is preferably introduced into the high chloride grains after at least 50 (most preferably 75 and optimally 80) percent of the silver has been precipitated, but before precipitation of the central portion of the grains has been completed. Preferably class (i) dopant is introduced before 98 (most preferably 95 and optimally 90) percent of the silver has been precipitated. Stated in terms of the fully precipitated grain structure, class (i) dopant is preferably present in an interior shell region that surrounds at least 50 (most preferably 75 and optimally 80) percent of the silver and, with the more centrally located silver, accounts the entire central portion (99 percent of the silver), most preferably accounts for 95 percent, and optimally accounts for 90 percent of the silver halide forming the high chloride grains. The class (i) dopant can be distributed throughout the interior shell region delimited above or can be added as one or more bands within the interior shell region.

Class (i) dopant can be employed in any conventional useful concentration. A preferred concentration range is from $10^{-8}$ to $10^{-3}$ mole per silver mole, most preferably from $10^{-6}$ to $5\times10^{-4}$ mole per silver mole.

The following are specific illustrations of class (i) dopants:

(i-1) $[Fe(CN)_6]^{-4}$
(i-2) $[Ru(CN)_6]^{-4}$
(i-3) $[Os(CN)_6]^{-4}$
(i-4) $[Rh(CN)_6]^{-3}$
(i-5) $[Co(CN)_6]^{-3}$
(i-6) $[Fe(pyrazine)(CN)_5]^{-4}$
(i-7) $[RuCl(CN)_5]^{-4}$
(i-8) $[OsBr(CN)_5]^{-4}$
(i-9) $[RhF(CN)_5]^{-3}$
(i-10) $[In(NCS)_6]^{-3}$
(i-11) $[FeCO(CN)_5]^{-3}$
(i-12) $[RuF_2(CN)_4]^{-4}$
(i-13) $[OsCl_2(CN)_4]^{-4}$
(i-14) $[RhI_2(CN)_4]^{-3}$
(i-15) $[Ga(NCS)_6]^{-3}$
(i-16) $[Ru(CN)_5(OCN)]^{-4}$
(i-17) $[Ru(CN)_5(N_3)]^{-4}$
(i-18) $[Os(CN)_5(SCN)]^{-4}$
(i-19) $[Rh(CN)_5(SeCN)]^{-3}$
(i-20) $[Os(CN)Cl_5]^{-4}$
(i-21) $[Fe(CN)_3Cl_3]^{-3}$
(i-22) $[Ru(CO)_2(CN)_4]^{-1}$ When the class (i) dopants have a net negative charge, it is appreciated that they are associated with a counter ion when added to the reaction vessel during precipitation. The counter ion is of little importance, since it is ionically dissociated from the dopant in solution and is not incorporated within the grain. Common counter ions known to be fully compatible with silver chloride precipitation, such as ammonium and alkali metal ions, are contemplated. It is noted that the same comments apply to class (ii) dopants, otherwise described below.

The class (ii) dopant is an iridium coordination complex containing at least one thiazole or substituted thiazole ligand. Careful scientific investigations have revealed Group VIII hexahalo coordination complexes to create deep electron traps, as illustrated R. S. Eachus, R. E. Graves and M. T. Olm *J. Chem. Phys.*, Vol. 69, pp. 4580–7 (1978) and *Physica Status Solidi A*, Vol. 57, 429–37 (1980) and R. S. Eachus and M. T. Olm *Annu. Rep. Prog. Chem. Sect. C. Phys. Chem.*, Vol. 83, 3, pp. 3–48 (1986). The class (ii) dopants employed in the practice of this invention are believed to create such deep electron traps. The thiazole ligands may be substituted with any photographically acceptable substituent which does not prevent incorporation of the dopant into the silver halide grain. Exemplary substituents include lower alkyl (e.g., alkyl groups containing 1–4 carbon atoms), and specifically methyl. A specific example of a substituted thiazole ligand which may be used in accordance with the invention is 5-methylthiazole. The class (ii) dopant preferably is an iridium coordination complex having ligands each of which are more electropositive than a cyano ligand. In a specifically preferred form the remaining non-thiazole or non-substituted-thiazole ligands of the coordination complexes forming class (ii) dopants are halide ligands.

It is specifically contemplated to select class (ii) dopants from among the coordination complexes containing organic ligands disclosed by Olm et al U.S. Pat. No. 5,360,712, Olm et al U.S. Pat. No. 5,457,021 and Kuromoto et al U.S. Pat. No. 5,462,849.

In a preferred form it is contemplated to employ as a class (ii) dopant a hexacoordination complex satisfying the formula:

$[IrL^1_6]^{n'}$ (II)

wherein n' is zero, −1, −2, −3 or −4; and $L^1_6$ represents six bridging ligands which can be independently selected, provided that at least four of the ligands are anionic ligands, each of the ligands is more electropositive than a cyano ligand, and at least one of the ligands comprises a thiazole or substituted thiazole ligand. In a specifically preferred form at least four of the ligands are halide ligands, such as chloride or bromide ligands.

Class (ii) dopant is preferably introduced into the high chloride grains after at least 50 (most preferably 85 and optimally 90) percent of the silver has been precipitated, but before precipitation of the central portion of the grains has been completed. Preferably class (ii) dopant is introduced before 99 (most preferably 97 and optimally 95) percent of the silver has been precipitated. Stated in terms of the fully precipitated grain structure, class (ii) dopant is preferably present in an interior shell region that surrounds at least 50 (most preferably 85 and optimally 90) percent of the silver and, with the more centrally located silver, accounts the entire central portion (99 percent of the silver), most preferably accounts for 97 percent, and optimally accounts for 95 percent of the silver halide forming the high chloride grains. The class (ii) dopant can be distributed throughout the interior shell region delimited above or can be added as one or more bands within the interior shell region.

Class (ii) dopant can be employed in any conventional useful concentration. A preferred concentration range is from $10^{-9}$ to $10^{-4}$ mole per silver mole. Iridium is most preferably employed in a concentration range of from $10^{-8}$ to $10^{-5}$ mole per silver mole.

Specific illustrations of class (ii) dopants are the following:

(ii-1) $[IrCl_5(thiazole)]^{-2}$
(ii-2) $[IrCl_4(thiazole)_2]^{-1}$
(ii-3) $[IrBr_5(thiazole)]^{-2}$
(ii-4) $[IrBr_4(thiazole)_2]^{-1}$
(ii-5) $[IrCl_5(5\text{-methylthiazole})]^{-2}$
(ii-6) $[IrCl_4(5\text{-methylthiazole})_2]^{-1}$
(ii-7) $[IrBr_5(5\text{-methylthiazole})]^{-2}$
(ii-8) $[IrBr_4(5\text{-methylthiazole})_2]^{-1}$ In one preferred aspect of the invention in a layer using a magenta dye forming coupler, a class (ii) dopant in combination with an $OsCl_5(NO)$ dopant has been found to produce a preferred result.

Emulsions demonstrating the advantages of the invention can be realized by modifying the precipitation of conventional high chloride silver halide grains having predominantly (>50%) {100} crystal faces by employing a combination of class (i) and (ii) dopants as described above.

The silver halide grains precipitated contain greater than 50 mole percent chloride, based on silver. Preferably the grains contain at least 70 mole percent chloride and, optimally at least 90 mole percent chloride, based on silver. Iodide can be present in the grains up to its solubility limit, which is in silver iodochloride grains, under typical conditions of precipitation, about 11 mole percent, based on silver. It is preferred for most photographic applications to limit iodide to less than 5 mole percent iodide, most preferably less than 2 mole percent iodide, based on silver.

Silver bromide and silver chloride are miscible in all proportions. Hence, any portion, up to 50 mole percent, of the total halide not accounted for chloride and iodide, can be bromide. For color reflection print (i.e., color paper) uses bromide is typically limited to less than 10 mole percent based on silver and iodide is limited to less than 1 mole percent based on silver.

In a widely used form high chloride grains are precipitated to form cubic grains—that is, grains having {100} major faces and edges of equal length. In practice ripening effects usually round the edges and corners of the grains to some extent. However, except under extreme ripening conditions substantially more than 50 percent of total grain surface area is accounted for by {100} crystal faces.

High chloride tetradecahedral grains are a common variant of cubic grains. These grains contain 6 {100} crystal faces and 8 {111} crystal faces. Tetradecahedral grains are within the contemplation of this invention to the extent that greater than 50 percent of total surface area is accounted for by {100} crystal faces.

Although it is common practice to avoid or minimize the incorporation of iodide into high chloride grains employed in color paper, it is has been recently observed that silver iodochloride grains with {100} crystal faces and, in some instances, one or more {111} faces offer exceptional levels of photographic speed. In the these emulsions iodide is incorporated in overall concentrations of from 0.05 to 3.0 mole percent, based on silver, with the grains having a surface shell of greater than 50 Å that is substantially free of iodide and a interior shell having a maximum iodide concentration that surrounds a core accounting for at least 50 percent of total silver. Such grain structures are illustrated by Chen et al EPO 0 718 679.

In another improved form the high chloride grains can take the form of tabular grains having {100} major faces. Preferred high chloride {100} tabular grain emulsions are those in which the tabular grains account for at least 70 (most preferably at least 90) percent of total grain projected area. Preferred high chloride {100} tabular grain emulsions have average aspect ratios of at least 5 (most preferably at least >8). Tabular grains typically have thicknesses of less than 0.3 $\mu$m, preferably less than 0.2 $\mu$m, and optimally less than 0.07 $\mu$m. High chloride {100} tabular grain emulsions and their preparation are disclosed by Maskasky U.S. Pat. Nos. 5,264,337 and 5,292,632, House et al U.S. Pat. No. 5,320,938, Brust et al U.S. Pat. No. 5,314,798 and Chang et al U.S. Pat. No. 5,413,904.

Once high chloride grains having predominantly {100} crystal faces have been precipitated with a combination of class (i) and class (ii) dopants described above, chemical and spectral sensitization, followed by the addition of conventional addenda to adapt the emulsion for the imaging application of choice can take any convenient conventional form. These conventional features are illustrated by *Research Disclosure*, Item 38957, cited above, particularly:

III. Emulsion washing;
IV. Chemical sensitization;
V. Spectral sensitization and desensitization;
VII. Antifoggants and stabilizers;
VIII. Absorbing and scattering materials;
IX. Coating and physical property modifying addenda; and
X. Dye image formers and modifiers.

Some additional silver halide, typically less than 1 percent, based on total silver, can be introduced to facilitate chemical sensitization. It is also recognized that silver halide can be epitaxially deposited at selected sites on a host grain to increase its sensitivity. For example, high chloride {100} tabular grains with corner epitaxy are illustrated by Maskasky U.S. Pat. No. 5,275,930. For the purpose of providing a clear demarcation, the term "silver halide grain" is herein employed to include the silver necessary to form the grain up to the point that the final {100} crystal faces of the grain are formed. Silver halide later deposited that does not overlie the {100} crystal faces previously formed accounting for at least 50 percent of the grain surface area is excluded in determining total silver forming the silver halide grains. Thus, the silver forming selected site epitaxy is not part of the silver halide grains while silver halide that deposits and provides the final {100} crystal faces of the grains is included in the total silver forming the grains, even when it differs significantly in composition from the previously precipitated silver halide.

Image dye-forming couplers may be included in the element such as couplers that form cyan dyes upon reaction with oxidized color developing agents which are described in such representative patents and publications as: U.S. Pat. Nos. 2,367,531; 2,423,730; 2,474,293; 2,772,162; 2,895,826; 3,002,836; 3,034,892; 3,041,236; 4,883,746 and "Farbkuppler—Eine Literature Ubersicht," published in Agfa Mitteilungen, Band III, pp. 156–175 (1961). Preferably such couplers are phenols and naphthols that form cyan dyes on reaction with oxidized color developing agent. Also preferable are the cyan couplers described in, for instance, European Patent Application Nos. 491,197; 544,322; 556,700; 556,777; 565,096; 570,006; and 574,948.

Typical cyan couplers are represented by the following formulas:

CYAN-1

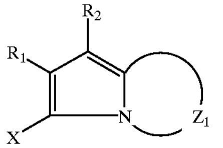

CYAN-2

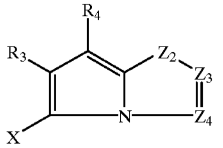

CYAN-3

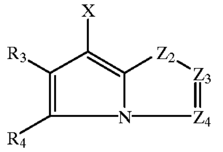

CYAN-4

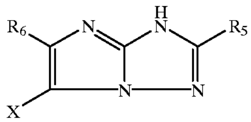

wherein $R_1$, $R_5$ and $R_8$ each represent a hydrogen or a substituent; $R_2$ represents a substituent; $R_3$, $R_4$ and $R_7$ each represent an electron attractive group having a Hammett's substituent constant $\sigma_{para}$ of 0.2 or more and the sum of the $\sigma_{para}$ values of $R_3$ and $R_4$ is 0.65 or more; $R_6$ represents an electron attractive group having a Hammett's substituent constant $\sigma_{para}$ of 0.35 or more; X represents a hydrogen or a coupling-off group; $Z_1$ represents nonmetallic atoms necessary for forming a nitrogen-containing, six-membered, heterocyclic ring which has at least one dissociative group; $Z_2$ represents —C($R_7$)= and —N=; and $Z_3$ and $Z_4$ each represent —C($R_8$)= and —N=.

For purposes of this invention, an "NB coupler" is a dye-forming coupler which is capable of coupling with the developer 4-amino-3-methyl-N-ethyl-N-(2-methanesulfonamidoethyl) aniline sesquisulfate hydrate to form a dye for which the left bandwidth (LBW) of its absorption spectra upon "spin coating" of a 3% w/v solution of the dye in di-n-butyl sebacate solvent is at least 5 nm. less than the LBW for a 3% w/v solution of the same dye in acetonitrile. The LBW of the spectral curve for a dye is the distance between the left side of the spectral curve and the wavelength of maximum absorption measured at a density of half the maximum.

The "spin coating" sample is prepared by first preparing a solution of the dye in di-n-butyl sebacate solvent (3% w/v). If the dye is insoluble, dissolution is achieved by the addition of some methylene chloride. The solution is filtered and 0.1–0.2 ml is applied to a clear polyethylene terephthalate support (approximately 4 cm×4 cm) and spun at 4,000 RPM using the Spin Coating equipment, Model No. EC101, available from Headway Research Inc., Garland Tex. The transmission spectra of the so prepared dye samples are then recorded.

Preferred "NB couplers" form a dye which, in n-butyl sebacate, has a LBW of the absorption spectra upon "spin coating" which is at least 15 nm, preferably at least 25 nm, less than that of the same dye in a 3% solution (w/v) in acetonitrile.

In a preferred embodiment the cyan dye-forming "NB coupler" useful in the invention has the formula (IA)

(IA)

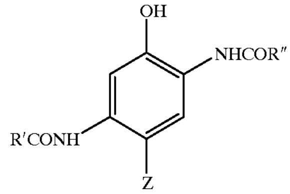

wherein

R' and R" are substituents selected such that the coupler is a "NB coupler", as herein defined; and Z is a hydrogen atom or a group which can be split off by the reaction of the coupler with an oxidized color developing agent.

The coupler of formula (IA) is a 2,5-diamido phenolic cyan coupler wherein the substituents R' and R" are preferably independently selected from unsubstituted or substituted alkyl, aryl, amino, alkoxy and heterocyclyl groups.

In a further preferred embodiment, the "NB coupler" has the formula (I):

(I)

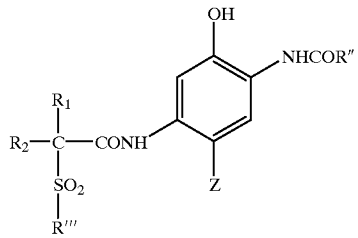

wherein

R" and R'" are independently selected from unsubstituted or substituted alkyl, aryl, amino, alkoxy and heterocyclyl groups and Z is as hereinbefore defined;

$R_1$ and $R_2$ are independently hydrogen or an unsubstituted or substituted alkyl group; and Typically, R" is an alkyl, amino or aryl group, suitably a phenyl group. R'" is desirably an alkyl or aryl group or a 5–10 membered heterocyclic ring which contains one or more heteroatoms selected from nitrogen, oxygen and sulfur, which ring group is unsubstituted or substituted.

In the preferred embodiment the coupler of formula (I) is a 2,5-diamido phenol in which the 5-amido moiety is an amide of a carboxylic acid which is substituted in the alpha position by a particular sulfone (—$SO_2$—) group, such as, for example, described in U.S. Pat. No. 5,686,235. The sulfone moiety is an unsubstituted or substituted alkylsulfone or a heterocyclyl sulfone or it is an arylsulfone, which is preferably substituted, in particular in the meta and/or para position.

Couplers having these structures of formulae (I) or (IA) comprise cyan dye-forming "NB couplers" which form image dyes having very sharp-cutting dye hues on the short wavelength side of the absorption curves with absorption maxima ($\lambda_{max}$) which are shifted hypsochromically and are generally in the range of 620–645 nm, which is ideally suited for producing excellent color reproduction and high color saturation in color photographic papers.

Referring to formula (I), $R_1$ and $R_2$ are independently hydrogen or an unsubstituted or substituted alkyl group, preferably having from 1 to 24 carbon atoms and in particular 1 to 10 carbon atoms, suitably a methyl, ethyl, n-propyl, isopropyl, butyl or decyl group or an alkyl group substituted with one or more fluoro, chloro or bromo atoms, such as a trifluoromethyl group. Suitably, at least one of $R_1$ and $R_2$ is a hydrogen atom and if only one of $R_1$ and $R_2$ is a hydrogen atom then the other is preferably an alkyl group having 1 to 4 carbon atoms, more preferably one to three carbon atoms and desirably two carbon atoms.

As used herein and throughout the specification unless where specifically stated otherwise, the term "alkyl" refers to an unsaturated or saturated straight or branched chain alkyl group, including alkenyl, and includes aralkyl and cyclic alkyl groups, including cycloalkenyl, having 3–8 carbon atoms and the term 'aryl' includes specifically fused aryl.

In formula (I), R" is suitably an unsubstituted or substituted amino, alkyl or aryl group or a 5–10 membered heterocyclic ring which contains one or more heteroatoms selected from nitrogen, oxygen and sulfur, which ring is unsubstituted or substituted, but is more suitably an unsubstituted or substituted phenyl group.

Examples of suitable substituent groups for this aryl or heterocyclic ring include cyano, chloro, fluoro, bromo, iodo, alkyl- or aryl-carbonyl, alkyl- or aryl-oxycarbonyl, carbonamido, alkyl- or aryl-carbonamido, alkyl- or aryl-sulfonyl, alkyl- or aryl-sulfonyloxy, alkyl- or aryl-oxysulfonyl, alkyl- or aryl-sulfoxide, alkyl- or aryl-sulfamoyl, alkyl- or aryl-sulfonamido, aryl, alkyl, alkoxy, aryloxy, nitro, alkyl- or aryl-ureido and alkyl- or aryl-carbamoyl groups, any of which may be further substituted. Preferred groups are halogen, cyano, alkoxycarbonyl, alkylsulfamoyl, alkyl-sulfonamido, alkylsulfonyl, carbamoyl, alkylcarbamoyl or alkylcarbonamido. Suitably, R" is a 4-chlorophenyl, 3,4-di-chlorophenyl, 3,4-difluorophenyl, 4-cyanophenyl, 3-chloro-4-cyanophenyl, pentafluorophenyl, or a 3- or 4-sulfonamidophenyl group.

In formula (I), when R'" is alkyl it may be unsubstituted or substituted with a substituent such as halogen or alkoxy. When R'" is aryl or a heterocycle, it may be substituted. Desirably it is not substituted in the position alpha to the sulfonyl group.

In formula (I), when R'" is a phenyl group, it may be substituted in the meta and/or para positions with one to three substituents independently selected from the group consisting of halogen, and unsubstituted or substituted alkyl, alkoxy, aryloxy, acyloxy, acylamino, alkyl- or aryl-sulfonyloxy, alkyl- or aryl-sulfamoyl, alkyl- or aryl-sulfamoylamino, alkyl- or aryl-sulfonamido, alkyl- or aryl-ureido, alkyl- or aryl-oxycarbonyl, alkyl- or aryl-oxy-carbonylamino and alkyl- or aryl-carbamoyl groups.

In particular each substituent may be an alkyl group such as methyl, t-butyl, heptyl, dodecyl, pentadecyl, octadecyl or 1,1,2,2-tetramethylpropyl; an alkoxy group such as methoxy, t-butoxy, octyloxy, dodecyloxy, tetradecyloxy, hexadecyloxy or octadecyloxy; an aryloxy group such as phenoxy, 4-t-butylphenoxy or 4-dodecyl-phenoxy; an alkyl- or aryl-acyloxy group such as acetoxy or dodecanoyloxy; an alkyl- or aryl-acylamino group such as acetamido, hexadecanamido or benzamido; an alkyl- or aryl-sulfonyloxy group such as methyl-sulfonyloxy, dodecylsulfonyloxy or 4-methylphenyl-sulfonyloxy; an alkyl- or aryl-sulfamoyl-group such as N-butylsulfamoyl or N-4-t-butylphenylsulfamoyl; an alkyl- or aryl-sulfamoylamino group such as N-butyl-sulfamoylamino or N-4-t-butylphenylsulfamoyl-amino; an alkyl- or aryl-sulfonamido group such as methane-sulfonamido, hexadecanesulfonamido or 4-chlorophenyl-sulfonamido; an alkyl- or aryl-ureido group such as methylureido or phenylureido; an alkoxy- or aryloxy-carbonyl such as methoxycarbonyl or phenoxycarbonyl; an alkoxy- or aryloxy-carbonylamino group such as methoxycarbonylamino or phenoxycarbonylamino; an alkyl- or aryl-carbamoyl group such as N-butylcarbamoyl or N-methyl-N-dodecylcarbamoyl; or a perfluoroalkyl group such as trifluoromethyl or heptafluoropropyl.

Suitably the above substituent groups have 1 to 30 carbon atoms, more preferably 8 to 20 aliphatic carbon atoms. A desirable substituent is an alkyl group of 12 to 18 aliphatic carbon atoms such as dodecyl, pentadecyl or octadecyl or an alkoxy group with 8 to 18 aliphatic carbon atoms such as dodecyloxy and hexadecyloxy or a halogen such as a meta or para chloro group, carboxy or sulfonamido. Any such groups may contain interrupting heteroatoms such as oxygen to form e.g. polyalkylene oxides.

In formula (I) or (IA) Z is a hydrogen atom or a group which can be split off by the reaction of the coupler with an oxidized color developing agent, known in the photographic art as a 'coupling-off group' and may preferably be hydrogen, chloro, fluoro, substituted aryloxy or mercaptotetrazole, more preferably hydrogen or chloro.

The presence or absence of such groups determines the chemical equivalency of the coupler, i.e., whether it is a 2-equivalent or 4-equivalent coupler, and its particular identity can modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction, and the like.

Representative classes of such coupling-off groups include, for example, halogen, alkoxy, aryloxy, heterocyclyloxy, sulfonyloxy, acyloxy, acyl, heterocyclylsulfonamido, heterocyclylthio, benzothiazolyl, phosophonyloxy, alkylthio, arylthio, and arylazo. These coupling-off groups are described in the art, for example, in U.S. Pat. Nos. 2,455,169; 3,227,551; 3,432,521; 3,467,563; 3,617,291; 3,880,661; 4,052,212; and 4,134,766; and in U. K. Patent Nos. and published applications 1,466,728; 1,531,927; 1,533,039; 2,066,755A, and 2,017,704A. Halogen, alkoxy, and aryloxy groups are most suitable.

Examples of specific coupling-off groups are —Cl, —F, —Br, —SCN, $—OCH_3$, $—OC_6H_5$, $—OCH_2C(=O)NHCH_2CH_2OH$, $—OCH_2C(O)NHCH_2CH_2OCH_3$, $—OCH_2C(O)NHCH_2CH_2OC(=O)OCH_3$, $—P(=O)(OC_2H_5)_2$, $—SCH_2CH_2COOH$,

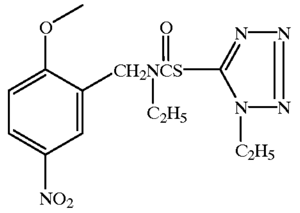

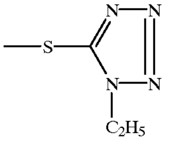

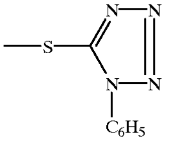

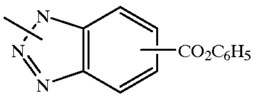

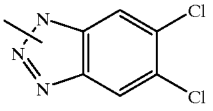

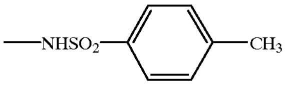

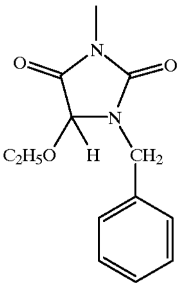

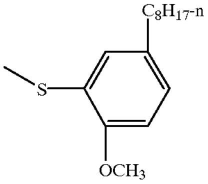

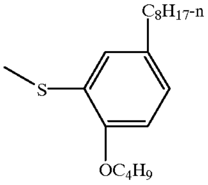

-continued

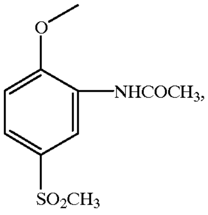

and

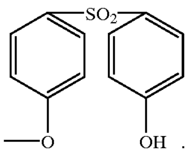

.

Typically, the coupling-off group is a chlorine atom, hydrogen atom or p-methoxyphenoxy group.

It is essential that the substituent groups be selected so as to adequately ballast the coupler and the resulting dye in the organic solvent in which the coupler is dispersed. The ballasting may be accomplished by providing hydrophobic substituent groups in one or more of the substituent groups. Generally a ballast group is an organic radical of such size and configuration as to confer on the coupler molecule sufficient bulk and aqueous insolubility as to render the coupler substantially nondiffusible from the layer in which it is coated in a photographic element. Thus the combination of substituent are suitably chosen to meet these criteria. To be effective, the ballast will usually contain at least 8 carbon atoms and typically contains 10 to 30 carbon atoms. Suitable ballasting may also be accomplished by providing a plurality of groups which in combination meet these criteria. In the preferred embodiments of the invention $R_1$ in formula (I) is a small alkyl group or hydrogen. Therefore, in these embodiments the ballast would be primarily located as part of the other groups. Furthermore, even if the coupling-off group Z contains a ballast it is often necessary to ballast the other substituents as well, since Z is eliminated from the molecule upon coupling; thus, the ballast is most advantageously provided as part of groups other than Z.

The following examples further illustrate preferred coupler of the invention. It is not to be construed that the present invention is limited to these examples.

IC-1

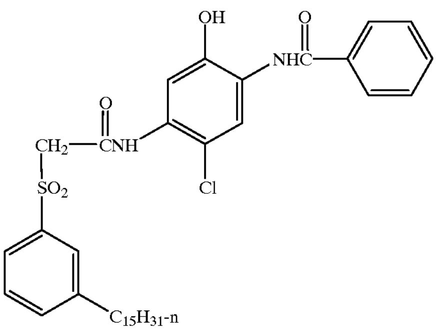

-continued
IC-2
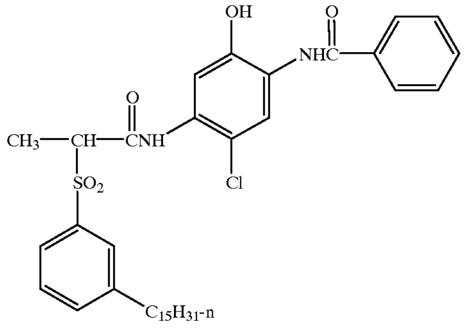
IC-3
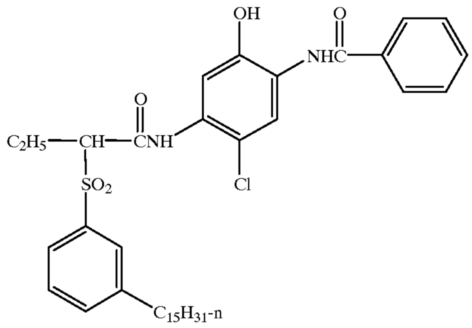
IC-4
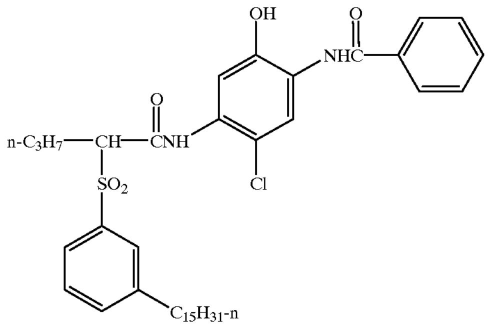
IC-5
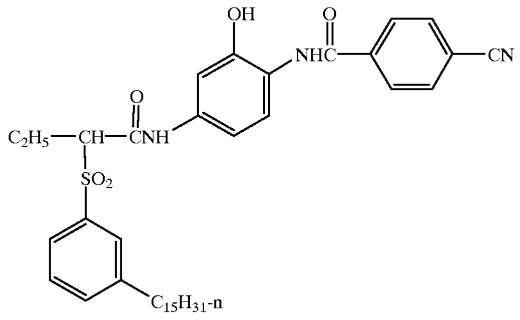
-continued
IC-6
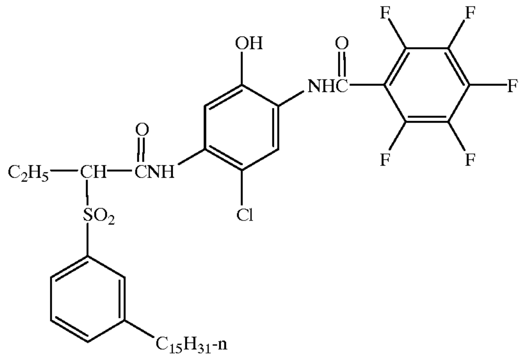
IC-7
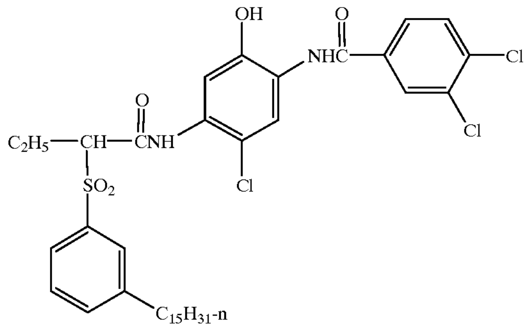
IC-8
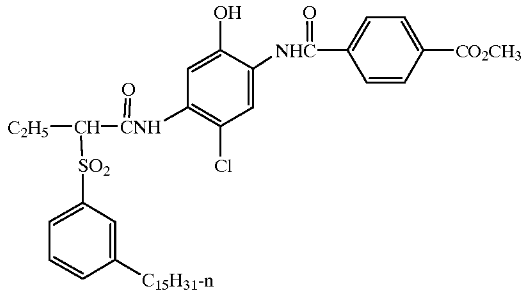
IC-9
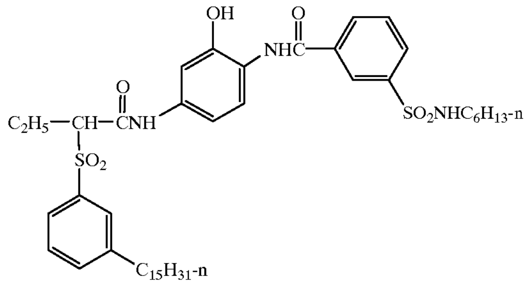

-continued
IC-10
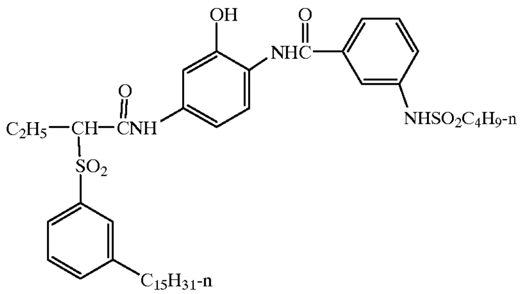
IC-11
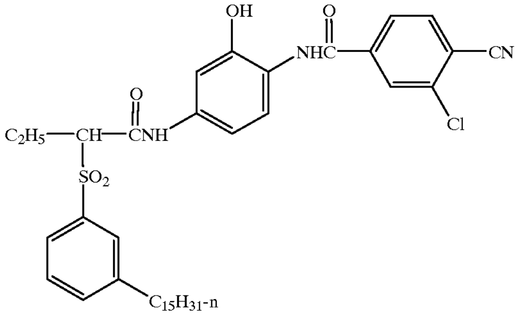
IC-12
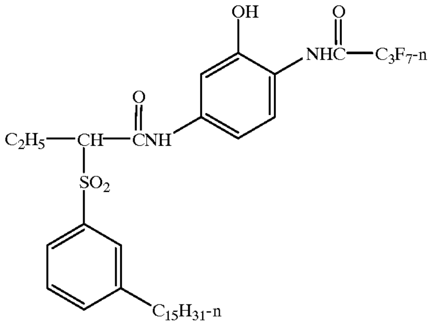
IC-13
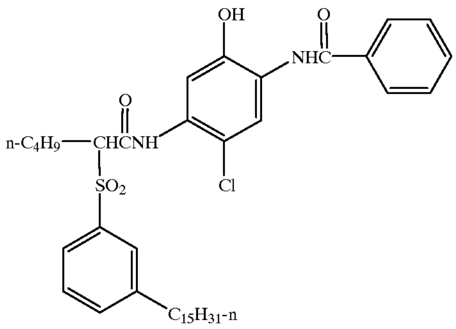
-continued
IC-14
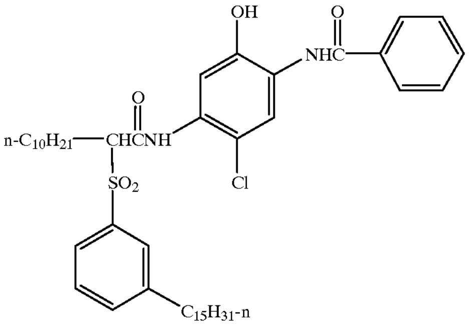
IC-15
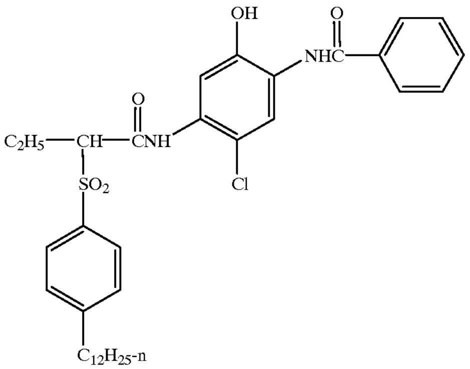
IC-16
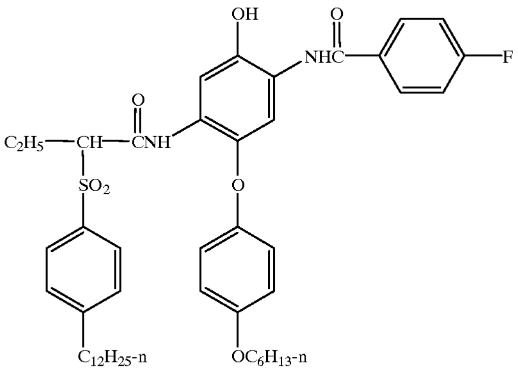
IC-17
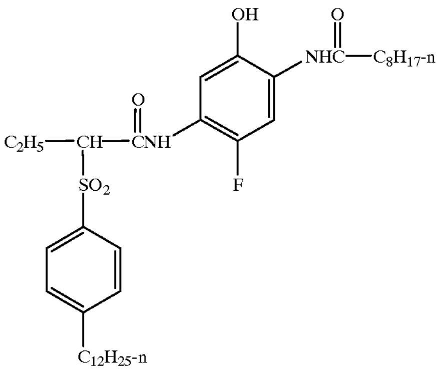

-continued
IC-18
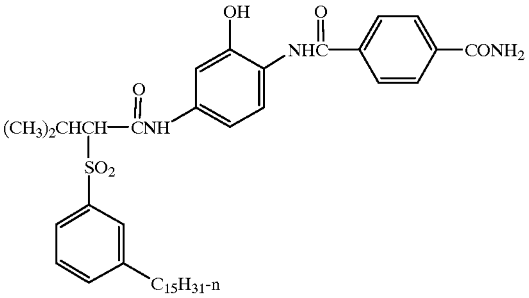
IC-19
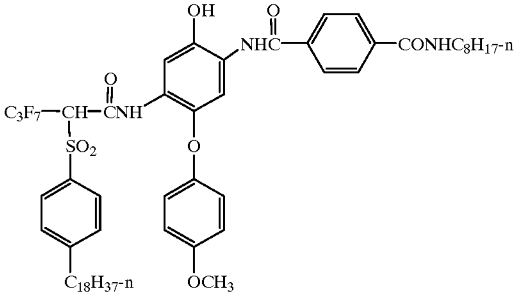
IC-20
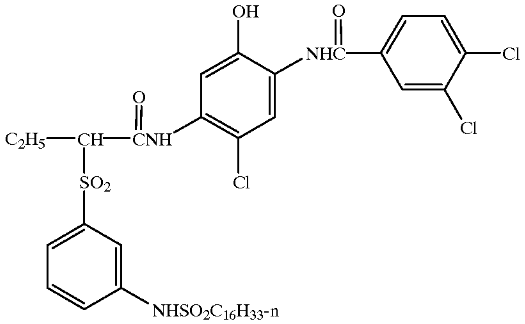
IC-21
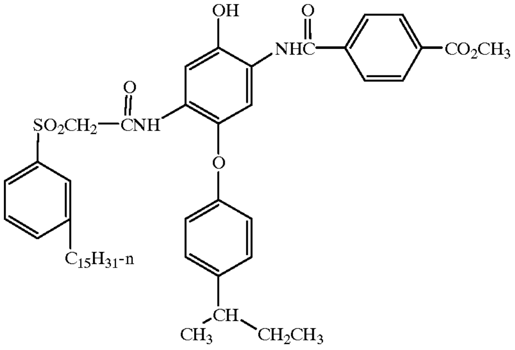
-continued
IC-22
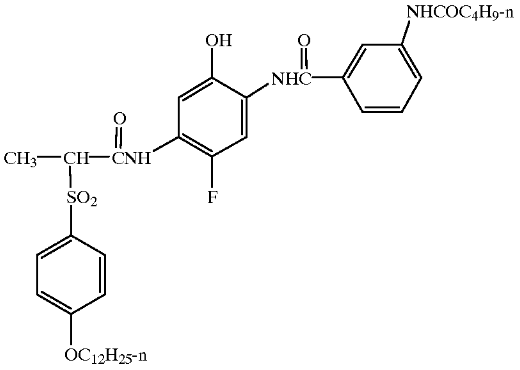
IC-23
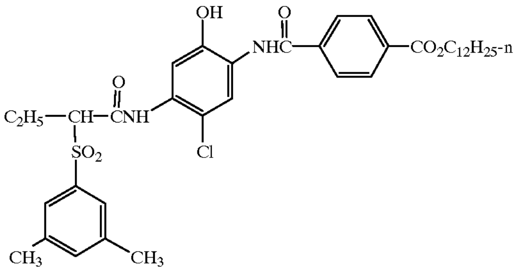
IC-24
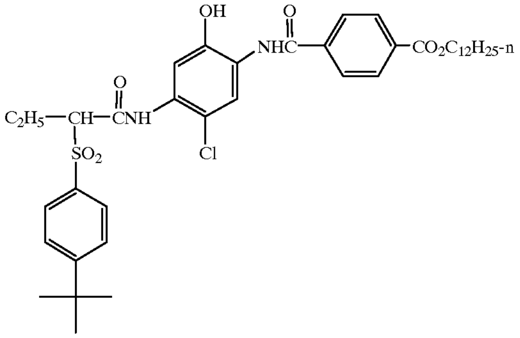
IC-25
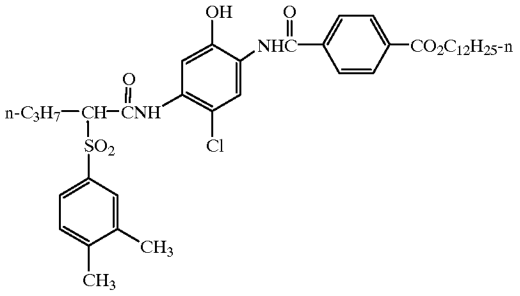

-continued
IC-26
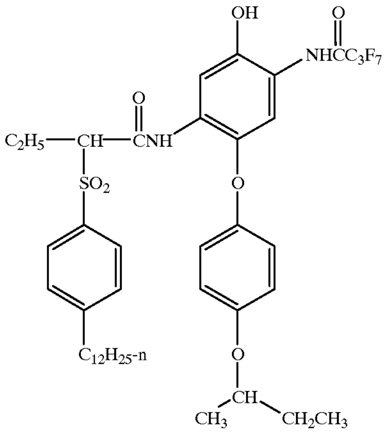
IC-27
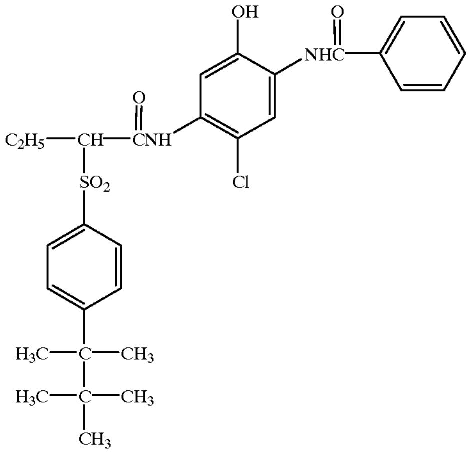
IC-28
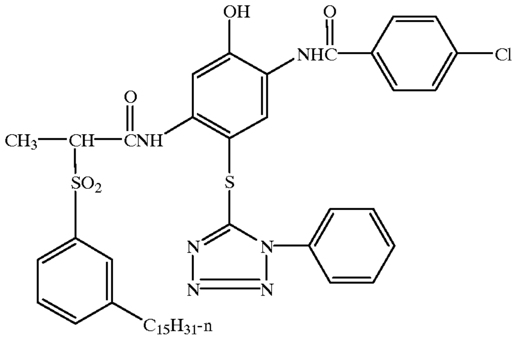
-continued
IC-29
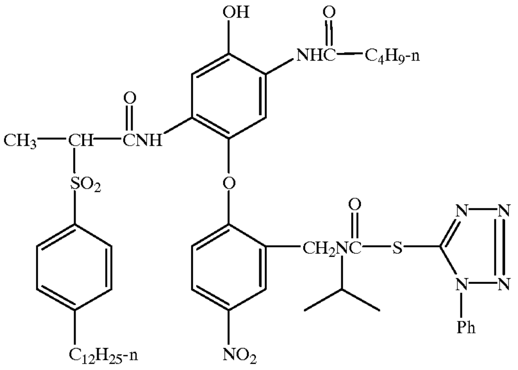
IC-30
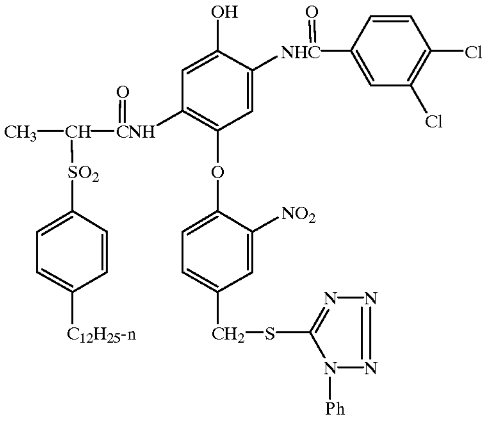
IC-31
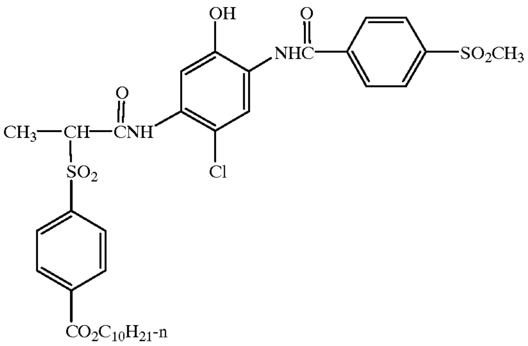
IC-32
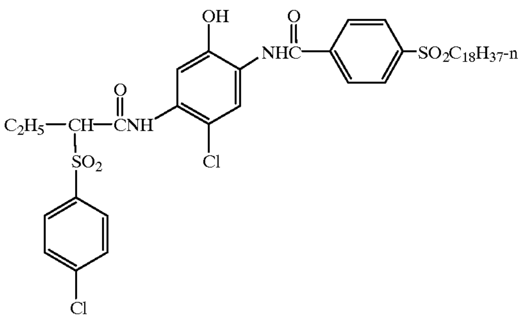

-continued
IC-33
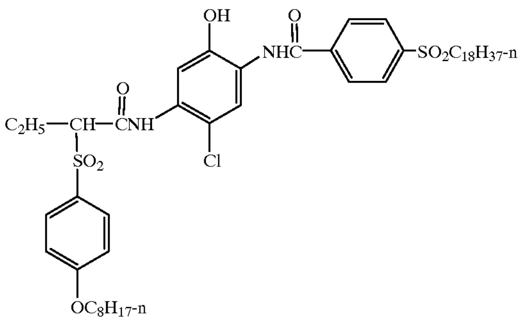
IC-34
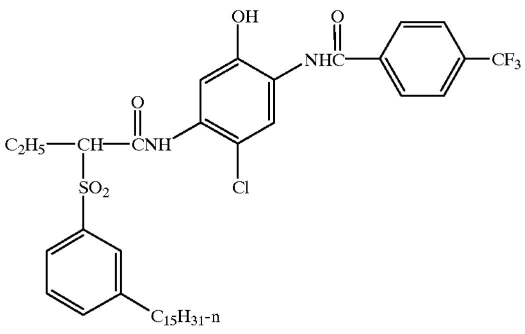
IC-35
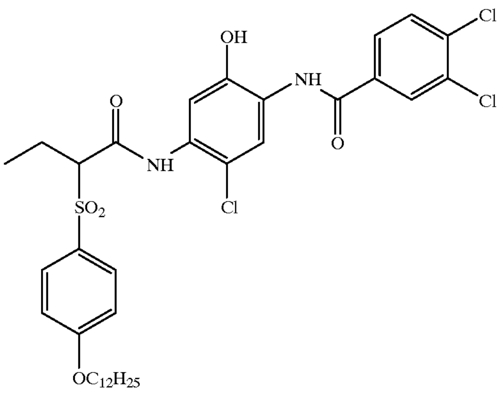
IC-36
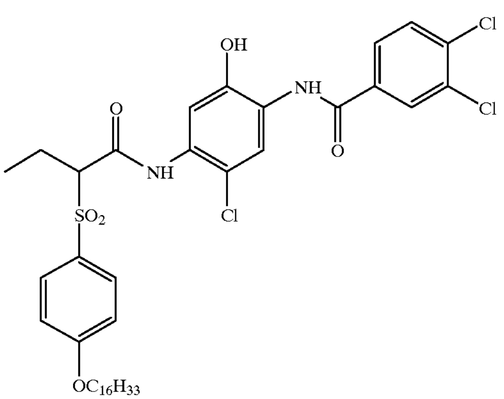
-continued
IC-37
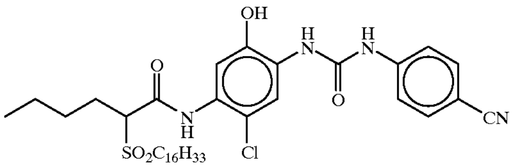
IC-38
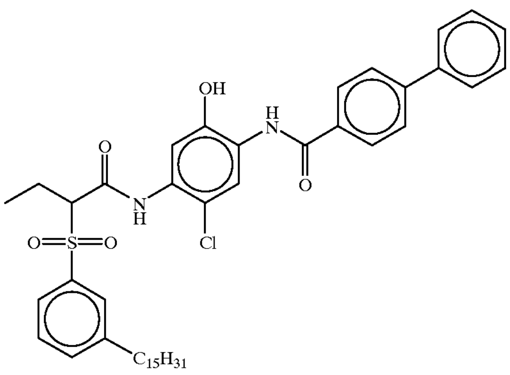
IC-39
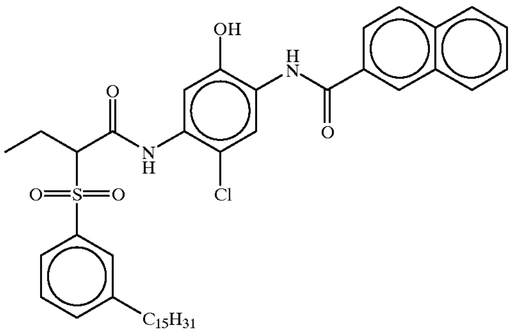
IC-40
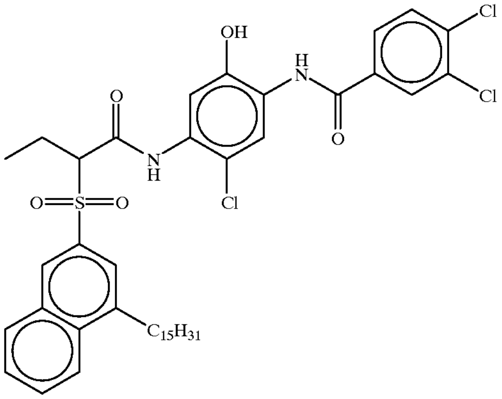
Preferred couplers are IC-3, IC-7, IC-35, and IC-36 because of their suitably narrow left bandwidths.
Couplers that form magenta dyes upon reaction with oxidized color developing agent are described in such representative patents and publications as: U.S. Pat. Nos. 2,311,082; 2,343,703; 2,369,489; 2,600,788; 2,908,573; 3,062,653; 3,152,896; 3,519,429; 3,758,309; and “Farbkuppler-eine Literature Ubersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents. Especially preferred couplers are 1H-pyrazolo [5,1-c]-1,2,4-triazole and 1H-pyrazolo [1,5-b]-1,2,4-triazole. Examples of 1H-pyrazolo [5,1-c]-1,2,4-triazole couplers are described in U. K. Patent Nos. 1,247,493; 1,252,418; 1,398,979; U.S. Pat. Nos. 4,443,536; 4,514,490; 4,540,654; 4,590,153; 4,665,015; 4,822,730; 4,945,034; 5,017,465; and 5,023,170. Examples of 1H-pyrazolo [1,5-b]-1,2,4-triazoles can be found in European Patent applications 176,804; 177,765; U.S Pat. Nos. 4,659,652; 5,066,575; and 5,250,400.

Typical pyrazoloazole and pyrazolone couplers are represented by the following formulas:

MAGENTA-1

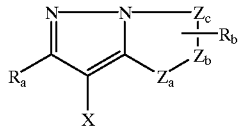

MAGENTA-2

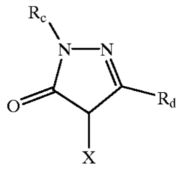

wherein $R_a$ and $R_b$ independently represent H or a substituent; $R_c$ is a substituent (preferably an aryl group); $R_d$ is a substituent (preferably an anilino, carbonamido, ureido, carbamoyl, alkoxy, aryloxycarbonyl, alkoxycarbonyl, or N-heterocyclic group); X is hydrogen or a coupling-off group; and $Z_a$, $Z_b$, and $Z_c$ are independently a substituted methine group, =N—, =C—, or —NH—, provided that one of either the $Z_a$—$Z_b$ bond or the $Z_b$—$Z_c$ bond is a double bond and the other is a single bond, and when the $Z_b$—$Z_c$ bond is a carbon—carbon double bond, it may form part of an aromatic ring, and at least one of $Z_a$, $Z_b$, and $Z_c$ represents a methine group connected to the group $R_b$.

Specific examples of such couplers are:

M-1

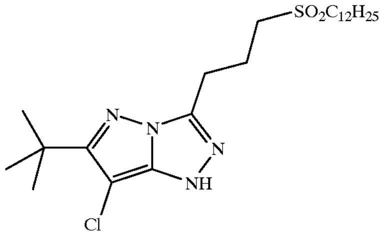

-continued

M-2

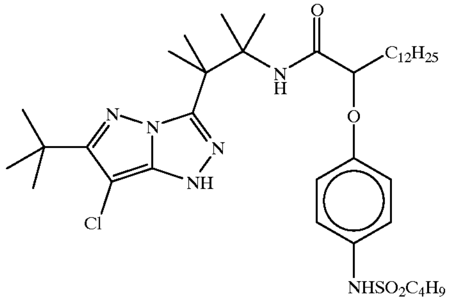

M-3

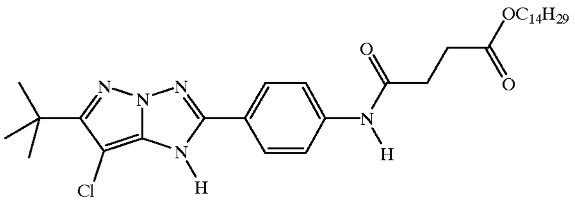

M-4

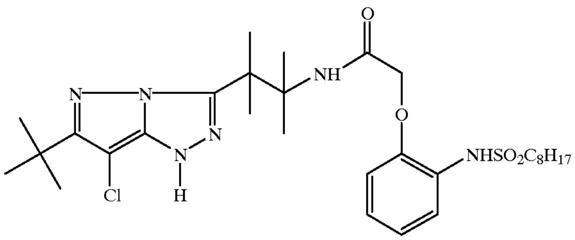

M-5

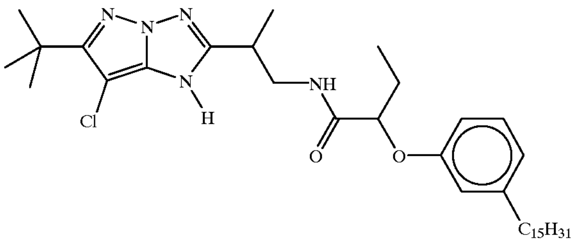

Couplers that form yellow dyes upon reaction with oxidized color developing agent are described in such representative patents and publications as: U.S. Pat. Nos. 2,298,443; 2,407,210; 2,875,057; 3,048,194; 3,265,506; 3,447,928; 3,960,570; 4,022,620; 4,443,536; 4,910,126; and 5,340,703 and "Farbkuppler-eine Literature Ubersicht," published in Agfa Milteilungen, Band III, pp. 112–126 (1961). Such couplers are typically open chain ketomethylene compounds. Also preferred are yellow couplers such as described in, for example, European Patent Application Nos. 482,552; 510,535; 524,540; 543,367; and U.S. Pat. No. 5,238,803. For improved color reproduction, couplers which give yellow dyes that cut off sharply on the long wavelength side are particularly preferred (for example, see U.S. Pat. No. 5,360,713).

Typical preferred yellow couplers are represented by the following formulas:

-continued

YELLOW-1

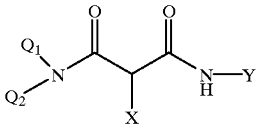

YELLOW-2

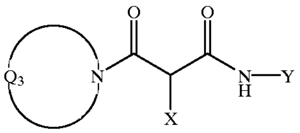

YELLOW-3

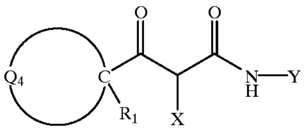

YELLOW-4

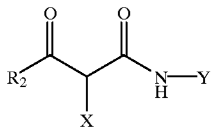

wherein $R_1$, $R_2$, $Q_1$ and $Q_2$ each represents a substituent; X is hydrogen or a coupling-off group; Y represents an aryl group or a heterocyclic group; $Q_3$ represents an organic residue required to form a nitrogen-containing heterocyclic group together with the >N—; and $Q_4$ represents nonmetallic atoms necessary to from a 3- to 5-membered hydrocarbon ring or a 3- to 5-membered heterocyclic ring which contains at least one hetero atom selected from N, O, S, and P in the ring. Particularly preferred is when $Q_1$ and $Q_2$ each represent an alkyl group, an aryl group, or a heterocyclic group, and $R_2$ represents an aryl or tertiary alkyl group.

Preferred yellow couplers can be of the following general structures:

Y-1

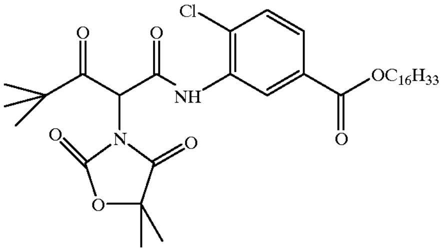

Y-2

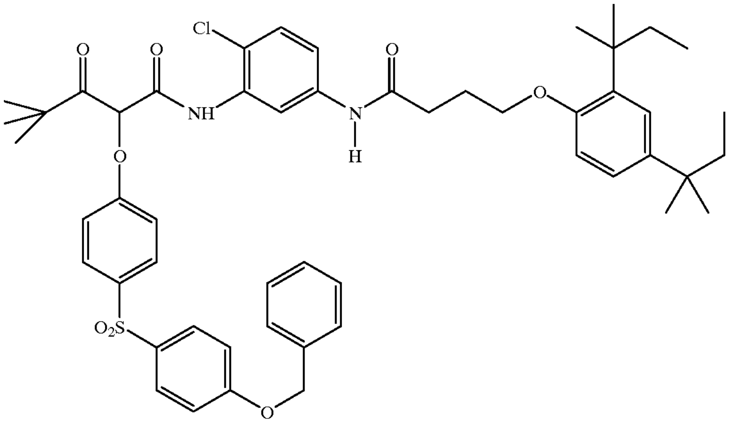

-continued

Y-3

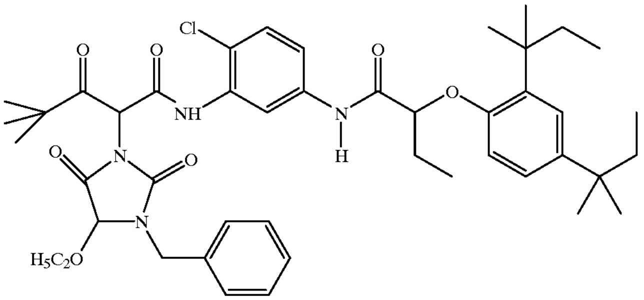

Y-4

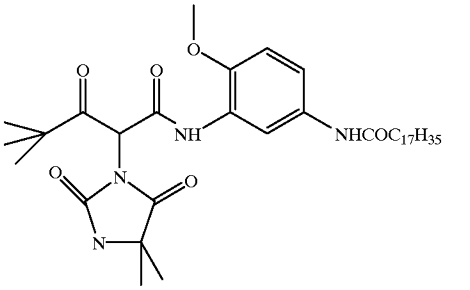

Y-5

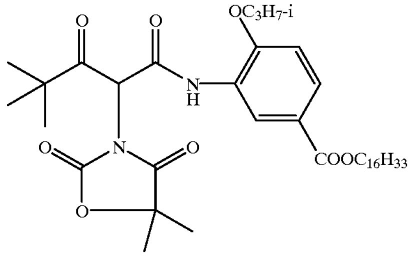

Y-6

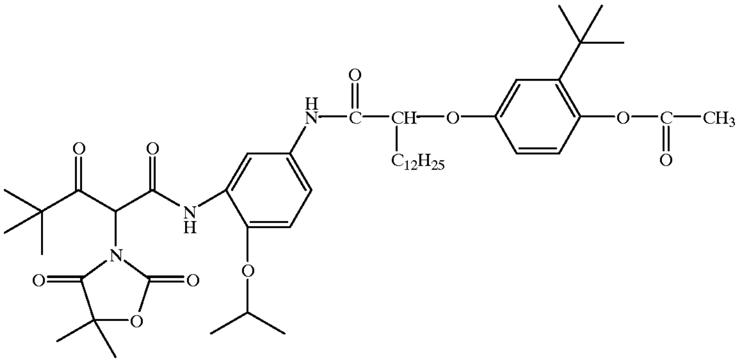

Unless otherwise specifically stated, substituent groups which may be substituted on molecules herein include any groups, whether substituted or unsubstituted, which do not destroy properties necessary for photographic utility. When the term “group” is applied to the identification of a substituent containing a substitutable hydrogen, it is intended to encompass not only the substituent’s unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, $^{3}$-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-miethylphenoxy, alpha- or betanaphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl, methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy) ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylearbamoyloxy, and cyclohexylcarbonyloxy; amino, such as phenylanilino, 2-chlorcanilino, diethylamino, dodecylamino; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, releasing or releasable groups, etc. Generally, the above groups and substituents thereof may include those having up to 48 carbon atoms, typically 1 to 36 carbon atoms and usually less than 24 carbon atoms, but greater numbers are possible depending on the particular substituents selected.

Representative substituents on ballast groups include alkyl, aryl, alkoxy, aryloxy, alkylthio, hydroxy, halogen, alkoxycarbonyl, aryloxcarbonyl, carboxy, acyl, acyloxy, amino, anilino, carbonamido, carbamoyl, alkylsulfonyl, arylsulfonyl, sulfonamido, and sulfamoyl groups wherein the substituents typically contain 1 to 42 carbon atoms. Such substituents can also be further substituted.

Stabilizers and scavengers that can be used in these photographic elements, but are not limited to, the following.

ST-1

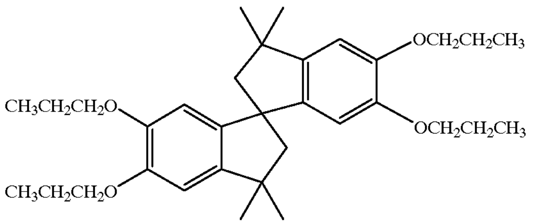

ST-2

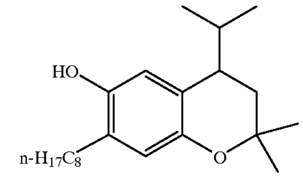

ST-3

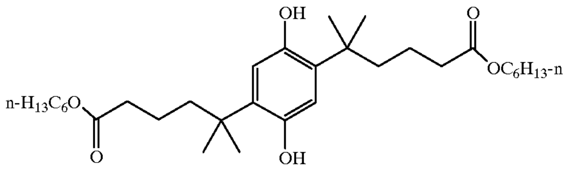

ST-4

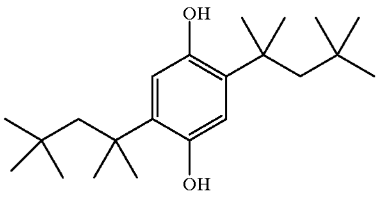

ST-5

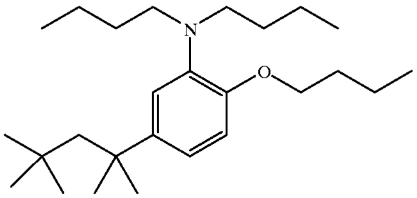

ST-6

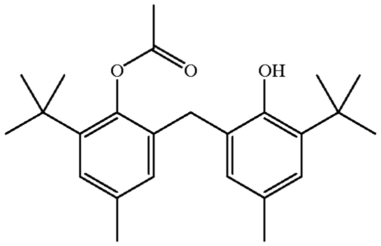

ST-7

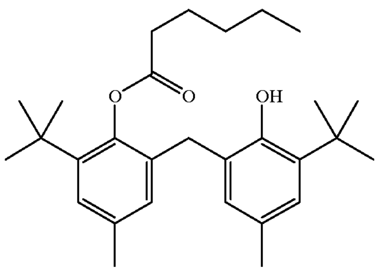

-continued
ST-8
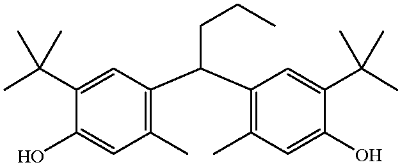
ST-9
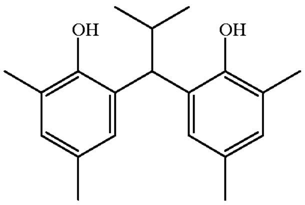
ST-10
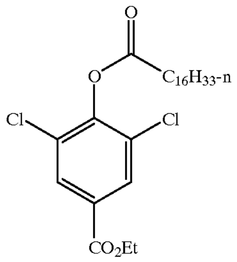
ST-11
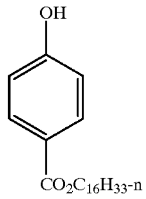
ST-12
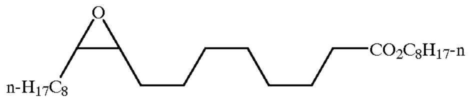
ST-13
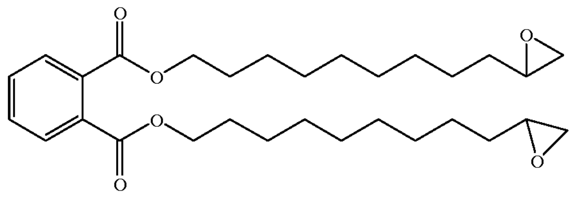
-continued
ST-14
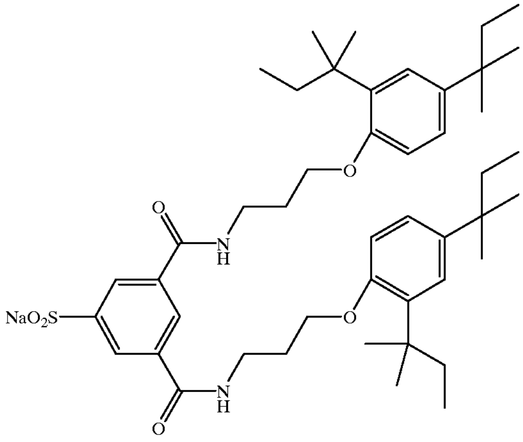
ST-15
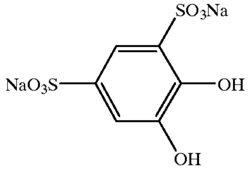
ST-16
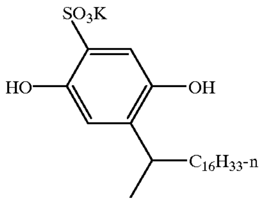
ST-17
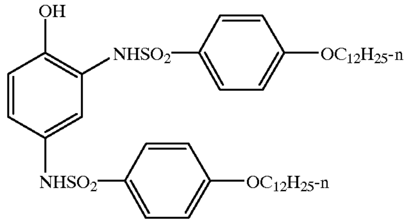
ST-18
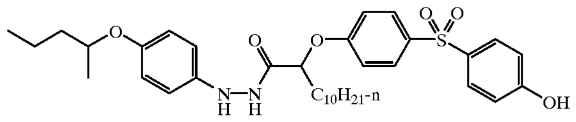
ST-19
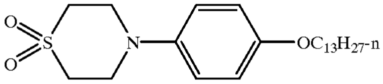
ST-20
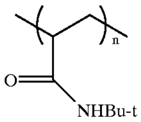
n = 75–8,000

-continued

ST-21

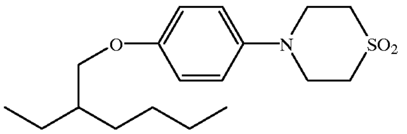

ST-22

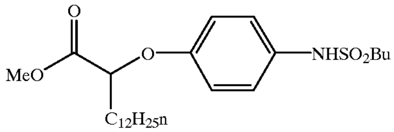

ST-23

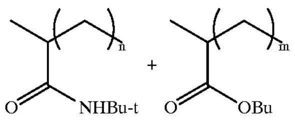

n:m 1:1 mw = 75–100,000

ST-24

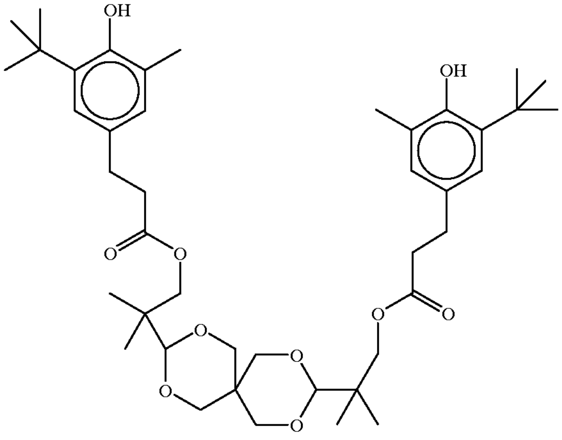

Examples of solvents which may be used in the invention include the following:

| | |
|---|---|
| Tritolyl phosphate | S-1 |
| Dibutyl phthalate | S-2 |
| Diundecyl phthalate | S-3 |
| N,N-Diethyldodecanamide | S-4 |
| N,N-Dibutyldodecanamide | S-5 |
| Tris(2-ethylhexyl)phosphate | S-6 |
| Acetyl tributyl citrate | S-7 |
| 2,4-Di-tert-pentylphenol | S-8 |
| 2-(2-Butoxyethoxy)ethyl acetate | S-9 |
| 1,4-Cyclohexyldimethylene bis(2-ethylhexanoate) | S-10 |

The dispersions used in photographic elements may also include ultraviolet (UV) stabilizers and so called liquid UV stabilizers such as described in U.S. Pat. Nos. 4,992,358; 4,975,360; and 4,587,346. Examples of UV stabilizers are shown below.

UV-1

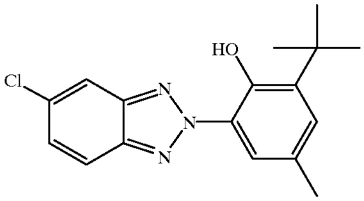

UV-2

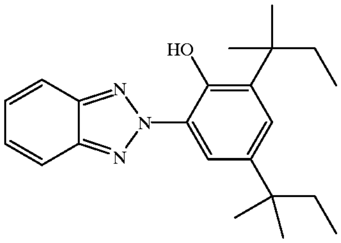

UV-3

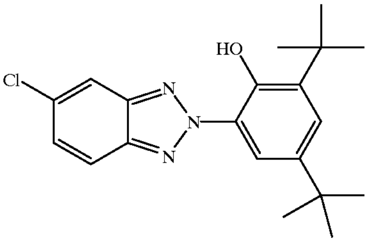

UV-4

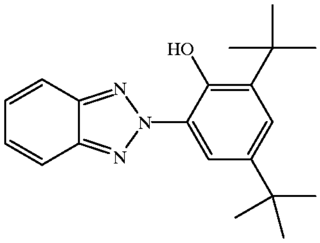

UV-5

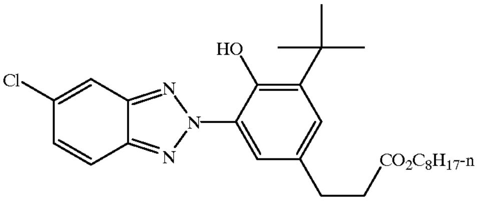

UV-6

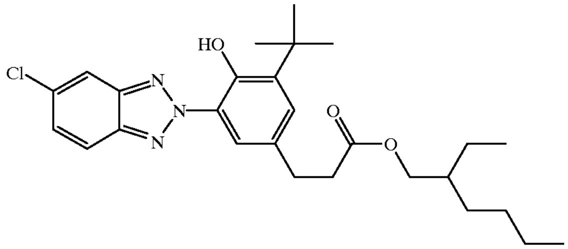

UV-7

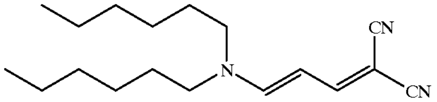

-continued

UV-8

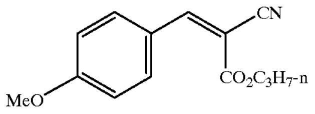

The aqueous phase may include surfactants. Surfactant may be cationic, anionic, zwitterionic or non-ionic. Useful surfactants include, but are not limited to, the following:

SF-1

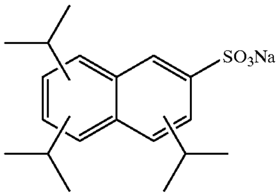

SF-2

$CF_3 \cdot (CF_2)_7 \cdot SO_3Na$

SF-3

$CH_3 \cdot (CH_2)_n \cdot SO_3Na$, n = 12–14

SF-4

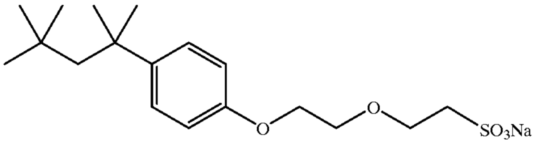

SF-5

$CH_3 \cdot (CH_2)_{11} \cdot OSO_3Na$

SF-6

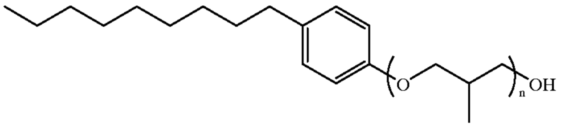

n = ca. 10

SF-7

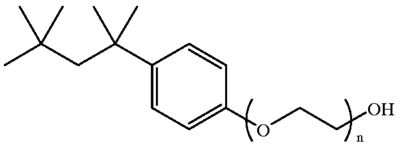

n = ca. 40

SF-8

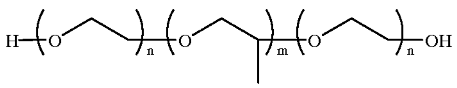

n = ca. 6, m = ca. 2

SF-9

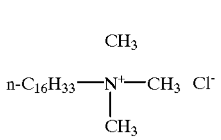

SF-10

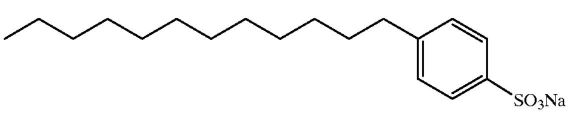

-continued

SF-11

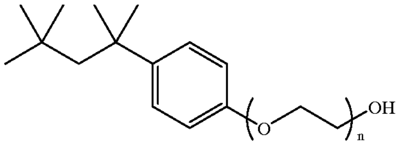

n = ca. 10

SF-12

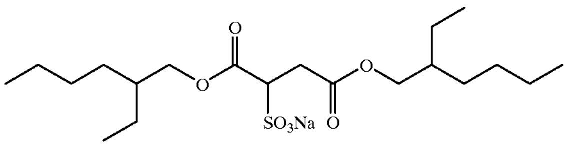

Further, it is contemplated to stabilize photographic dispersions prone to particle growth through the use of hydrophobic, photographically inert compounds such as disclosed by Zengerle et al in U.S. Pat. No. 5,468,604.

In a preferred embodiment the invention employs recording elements which are constructed to contain at least three silver halide emulsion layer units. A suitable full color, multilayer format for a recording element used in the invention is represented by Structure I.

| STRUCTURE I |
|---|
| Red-sensitized<br>cyan dye image-forming silver halide emulsion unit |
| Interlayer |
| Green-sensitized<br>magenta dye image-forming silver halide emulsion unit |
| Interlayer |
| Blue-sensitized<br>yellow dye image-forming silver halide emulsion unit |
| ///// Support ///// |

wherein the red-sensitized, cyan dye image-forming silver halide emulsion unit is situated nearest the support; next in order is the green-sensitized, magenta dye image-forming unit, followed by the uppermost blue-sensitized, yellow dye image-forming unit. The image-forming units are separated from each other by hydrophilic colloid interlayers containing an oxidized developing agent scavenger to prevent color contamination. Silver halide emulsions satisfying the grain and gelatino-peptizer requirements described above can be present in any one or combination of the emulsion layer units. Additional useful multicolor, multilayer formats for an element of the invention include structures as described in U.S. Pat. No. 5,783,373. Each of such structures in accordance with the invention preferably would contain at least three silver halide emulsions comprised of high chloride grains having at least 50 percent of their surface area bounded by {100} crystal faces and containing dopants from classes (i) and (ii), as described above. Preferably each of the emulsion layer units contains emulsion satisfying these criteria.

Conventional features that can be incorporated into multilayer (and particularly multicolor) recording elements contemplated for use in the method of the invention are illustrated by Research Disclosure, Item 38957, cited above:

XI. Layers and layer arrangements

XII. Features applicable only to color negative

XIII. Features applicable only to color positive B. Color reversal C. Color positives derived from color negatives XIV. Scan facilitating features.

The recording elements comprising the radiation sensitive high chloride emulsion layers according to this invention can be conventionally optically printed, or in accordance with a particular embodiment of the invention can be image-wise exposed in a pixel-by-pixel mode using suitable high energy radiation sources typically employed in electronic printing methods. Suitable actinic forms of energy encompass the ultraviolet, visible and infrared regions of the electromagnetic spectrum as well as electron-beam radiation and is conveniently supplied by beams from one or more light emitting diodes or lasers, including gaseous or solid state lasers. Exposures can be monochromatic, orthochromatic or panchromatic. For example, when the recording element is a multilayer multicolor element, exposure can be provided by laser or light emitting diode beams of appropriate spectral radiation, for example, infrared, red, green or blue wavelengths, to which such element is sensitive. Multicolor elements can be employed which produce cyan, magenta and yellow dyes as a function of exposure in separate portions of the electromagnetic spectrum, including at least two portions of the infrared region, as disclosed in the previously mentioned U.S. Pat. No. 4,619,892. Suitable exposures include those up to 2000 nm, preferably up to 1500 nm. Suitable light emitting diodes and commercially available laser sources are known and commercially available. Imagewise exposures at ambient, elevated or reduced temperatures and/or pressures can be employed within the useful response range of the recording element determined by conventional sensitometric techniques, as illustrated by T. H. James, *The Theory of the Photographic Process*, 4th Ed., Macmillan, 1977, Chapters 4, 6, 17, 18 and 23.

It has been observed that anionic $[MX_xY_yL_z]$ hexacoordination complexes, where M is a group 8 or 9 metal (preferably iron, ruthenium or iridium), X is halide or pseudohalide (preferably Cl, Br or CN) x is 3 to 5, Y is $H_2O$, y is 0 or 1, L is a C—C, H—C or C—N—H organic ligand, and Z is 1 or 2, are surprisingly effective in reducing high intensity reciprocity failure (HIRF), low intensity reciprocity failure (LIRF) and thermal sensitivity variance and in in improving latent image keeping (LIK). As herein employed HIRF is a measure of the variance of photographic properties for equal exposures, but with exposure times ranging from $10^{-1}$ to $10^{-6}$ second. LIRF is a measure of the variance of photographic properties for equal exposures, but with exposure times ranging from $10^{-1}$ to 100 seconds. Although these advantages can be generally compatible with face centered cubic lattice grain structures, the most striking improvements have been observed in high (>50 mole %, preferably ≧90 mole %) chloride emulsions. Preferred C—C, H—C or C—N—H organic ligands are aromatic heterocycles of the type described in U.S. Pat. No. 5,462,849. The most effective C—C, H—C or C—N—H organic ligands are azoles and azines, either unsustituted or containing alkyl, alkoxy or halide substituents, where the alkyl moieties contain from 1 to 8 carbon atoms. Particularly preferred azoles and azines include thiazoles, thiazolines and pyrazines.

The quantity or level of high energy actinic radiation provided to the recording medium by the exposure source is generally at least $10^{-4}$ ergs/cm$^2$, typically in the range of about $10^{-4}$ ergs/cm$^2$ to $10^{-3}$ ergs/cm$^2$ and often from $10^{-3}$ ergs/cm$^2$ to $10^2$ ergs/cm$^2$. Exposure of the recording element in a pixel-by-pixel mode as known in the prior art persists for only a very short duration or time. Typical maximum exposure times are up to 100$\mu$ seconds, often up to 10$\mu$ seconds, and frequently up to only 0.5$\mu$ seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^7$ pixels/cm$^2$ and are typically in the range of about $10^4$ to $10^6$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al., *A Continuous-Tone Laser Color Printer*, Journal of Imaging Technology, Vol. 14, No. 3, June 1988, which is hereby incorporated herein by reference. As previously indicated herein, a description of some of the details of conventional electronic printing methods comprising scanning a recording element with high energy beams such as light emitting diodes or laser beams, are set forth in Hioki U.S. Pat. No. 5,126,235, European Patent Applications 479 167 A1 and 502 508 A1.

Once imagewise exposed, the recording elements can be processed in any convenient conventional manner to obtain a viewable image. Such processing is illustrated by Research Disclosure, Item 38957, cited above:

XVIII. Chemical development systems

XIX. Development

XX. Desilvering, washing, rinsing and stabilizing

In addition, a useful developer for the inventive material is a homogeneous, single part developing agent. The homogeneous, single-part color developing concentrate is prepared using a critical sequence of steps:

In the first step, an aqueous solution of a suitable color developing agent is prepared. This color developing agent is generally in the form of a sulfate salt. Other components of the solution can include an antioxidant for the color developing agent, a suitable number of alkali metal ions (in an at least stoichiometric proportion to the sulfate ions) provided by an alkali metal base, and a photographically inactive water-miscible or water-soluble hydroxy-containing organic solvent. This solvent is present in the final concentrate at a concentration such that the weight ratio of water to the organic solvent is from about 15:85 to about 50:50.

In this environment, especially at high alkalinity, alkali metal ions and sulfate ions form a sulfate salt that is precipitated in the presence of the hydroxy-containing organic solvent. The precipitated sulfate salt can then be readily removed using any suitable liquid/solid phase separation technique (including filtration, centrifugation or decantation). If the antioxidant is a liquid organic compound, two phases may be formed and the precipitate may be removed by discarding the aqueous phase.

The color developing concentrates of this invention include one or more color developing agents that are well known in the art that, in oxidized form, will react with dye forming color couplers in the processed materials. Such color developing agents include, but are not limited to, aminophenols, p-phenylenediamines (especially N,N-dialkyl-p-phenylenediamines) and others which are well known in the art, such as EP 0 434 097 A1 (published Jun. 26, 1991) and EP 0 530 921 A1 (published Mar. 10, 1993). It may be useful for the color developing agents to have one or more water-solubilizing groups as are known in the art. Further details of such materials are provided in Research Disclosure, publication 38957, pages 592–639 (September 1996). Research Disclosure is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "Research Disclosure".

Preferred color developing agents include, but are not limited to, N,N-diethyl p-phenylenediamine sulfate (KODAK Color Developing Agent CD-2), 4-amino-3-methyl-N-(2-methane sulfonamidoethyl)aniline sulfate, 4-(N-ethyl-N-β-hydroxyethylamino)-2-methylaniline sulfate (KODAK Color Developing Agent CD-4), p-hydroxyethylethylaminoaniline sulfate, 4-(N-ethyl-N-2-methanesulfonylaminoethyl)-2-methylphenylenediamine sesquisulfate (KODAK Color Developing Agent CD-3), 4-(N-ethyl-N- 2-methanesulfonylaminoethyl)-2-methylphenylenediamine sesquisulfate, and others readily apparent to one skilled in the art.

In order to protect the color developing agents from oxidation, one or more antioxidants are generally included in the color developing compositions. Either inorganic or organic antioxidants can be used. Many classes of useful antioxidants are known, including but not limited to, sulfites (such as sodium sulfite, potassium sulfite, sodium bisulfite and potassium metabisulfite), hydroxylamine (and derivatives thereof), hydrazines, hydrazides, amino acids, ascorbic acid (and derivatives thereof), hydroxamic acids, aminoketones, mono- and polysaccharides, mono- and polyamines, quaternary ammonium salts, nitroxy radicals, alcohols, and oximes. Also useful as antioxidants are 1,4-cyclohexadiones. Mixtures of compounds from the same or different classes of antioxidants can also be used if desired.

Especially useful antioxidants are hydroxylamine derivatives as described, for example, in U.S. Pat. Nos. 4,892,804; 4,876,174; 5,354,646; and 5,660,974, all noted above, and U.S. Pat. No. 5,646,327 (Burns et al). Many of these antioxidants are mono- and dialkylhydroxylamines having one or more substituents on one or both alkyl groups. Particularly useful alkyl substituents include sulfo, carboxy, amino, sulfonamido, carbonamido, hydroxy, and other solubilizing substituents.

More preferably, the noted hydroxylamine derivatives can be mono- or dialkylhydroxylamines having one or more hydroxy substituents on the one or more alkyl groups. Representative compounds of this type are described for example in U.S. Pat. No. 5,709,982 (Marrese et al), as having the structure I:

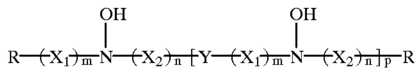

wherein R is hydrogen, a substituted or unsubstituted alkyl group of 1 to 10 carbon atoms, a substituted or unsubstituted hydroxyalkyl group of 1 to 10 carbon atoms, a substituted or unsubstituted cycloalkyl group of 5 to 10 carbon atoms, or a substituted or unsubstituted aryl group having 6 to 10 carbon atoms in the aromatic nucleus.

$X_1$ is $—CR_2(OH)CHR_1—$ and $X_2$ is $—CHR_1CR_2(OH)—$ wherein $R_1$ and $R_2$ are independently hydrogen, hydroxy, a substituted or unsubstituted alkyl group or 1 or 2 carbon atoms, a substituted or unsubstituted hydroxyalkyl group of 1 or 2 carbon atoms, or $R_1$ and $R_2$ together represent the carbon atoms necessary to complete a substituted or unsubstituted 5- to 8-membered saturated or unsaturated carbocyclic ring structure.

Y is a substituted or unsubstituted alkylene group having at least 4 carbon atoms, and has an even number of carbon atoms, or Y is a substituted or unsubstituted divalent aliphatic group having an even total number of carbon and oxygen atoms in the chain, provided that the aliphatic group has a least 4 atoms in the chain.

Also in Structure I, m, n and p are independently 0 or 1. Preferably, each of m and n is 1, and p is 0.

Specific di-substituted hydroxylamine antioxidants include, but are not limited to, N,N-bis(2,3-dihydroxypropyl)hydroxylamine, N,N-bis(2-methyl-2,3-dihydroxypropyl)hydroxylamine and N,N-bis(1-hydroxymethyl-2-hydroxy-3-phenylpropyl)hydroxylamine. The first compound is preferred.

The following examples illustrate the practice of this invention. They are not intended to be exhaustive of all possible variations of the invention. Parts and percentages are by weight unless otherwise indicated.

EXAMPLES

Example 1

In this example an imaging grade cellulose paper base is constructed of a combination typical cellulose fiber and glass fibers. This tear resistant paper base suitable for imaging supports combines the stiffness and smoothness characteristics of cellulose fiber with the improved strength of glass fiber added to the cellulose for tear resistance. The imaging grade cellulose paper base for the example:

A paper stock was produced for the imaged support using a standard fourdrinier paper machine and a blend of mostly bleached hardwood Kraft fibers. The cellulose fiber ratio consisted primarily of bleached poplar (38%) and maple/beech (30%) with lesser amounts of birch (18%) and softwood (7%). The cellulose fiber length was reduced from 0.73 mm length weighted average as measured by a Kajaani FS-200 to medium levels of conical refining and low levels of disc refining. Cellulose fiber Lengths from slurry generated were measured using a FS-200 Fiber Length Analyzer (Kajaani Automation Inc. ). Additionally, 7% glass fibers refined separately, with a fiber length of 0.6 micrometers is blended to the cellulose fiber mixture to improve the tear resistance of the paper. Acid sizing chemical addenda is utilized to maintain the pH of the sheet below 7.0. In the $3^{rd}$ Dryer section, ratio drying was utilized to provide a moisture bias from the face side to the wire side of the sheet. Sheet temperatures were raised to between 76° C. and 93° C. just prior to and during calendering. The paper was then calendered to an apparent density of 1.17. The paper base was produced at a basis weight of 178 $g/mm^2$ and thickness of 0.1524 mm, moisture levels after the calender is 7.0% to 9.0% by weight.

Beating of glass fibers must be done carefully and continued only long enough to open up and separate the fibers. Glass fibers do not fibrillate, and the major portion of the strength which is developed depends upon the mechanical entanglement and frictional resistance of the glass fibers in the final paper. Low pH during beating of glass fibers tends to improve strength. By beating at a temperature of 22° C. and adjusting the pH of the glass-water mixture to about 3.5 with sulfuric acid, it is possible to make a tremendous improvement in the strength of the final paper. The acid dissolves the alkali in the glass, leaving a thing gelatinous layer, rich in silica, on the surface of the fibers. The acid dissolved material is drained off during sheet formation, so that the finished paper has a pH of approximately 7.2 or substantially neutral.

The paper shows a tear resistance increase up to 22% solids resulting from surface tension effects. When mixed with wood fibers, glass fibers tend to reduce and burst and tensile strength, to increase porosity, and to increase wet tensile and tear strength. The addition of at least 5% glass fibers has been reported as reducing hygroexpansivity of paper 35%, by reducing shrinkage of the paper during drying. The use of glass fibers also results in a more "square' sheet as a result of more uniform shrinkage across the width of the web. Papers containing glass fibers generally require more draw on the machine and are wider at the dry end than normal paper made without glass fibers. Because glass fibers increase wet web strength and increase the drying rate, they make possible higher machine speeds.

The base paper of this example has a tear strength greater than 200 N and as a result has significant commercial value as a base material for tear resistant imaging bases. The paper of this example is also more resistant to corrosive liquids, heat, moisture, chemicals, and micro-organisms as is found in the wet processing of silver halide images or the heat created during thermal dye transfer printing of images. Because the base paper of this invention utilized cellulose fibers, the surface smoothness is suitable for the formation of glossy images. Finally, because the glass papers from microfibers are typically soft, absorbent, and flexible they can be used as a receiver for ink jet printing where dye or pigments are deposited on the surface of the paper using a ink jet printing head.

The invention has been described in detail with particular reference to certain preferred embodiments thereof, but it will be understood that variations and modifications can be effected within the spirit and scope of the invention.

What is claimed is:

1. An imaging element comprising a base comprising a cellulose fiber containing paper, wherein said paper has a tear resistance of between 200 and 1800 Newton wherein said base is provided with at least one melt extruded polyester layer.

2. The imaging element of claim 1 wherein said paper has an opacity of greater than 85.

3. The imaging element of claim 1 wherein said paper has a stiffness of greater than 120 millinewtons.

4. The imaging element of claim 1 wherein said paper has a surface roughness of between 0.30 and 0.95 $\mu$m at a spatial frequency of between 200 cycles/mm and 1300 cycles/mm.

5. The imaging element of claim 1 wherein said paper has a ratio of elastic modulus in the machine direction to elastic modulus in the cross direction of between 1.9 and 1.2.

6. The imaging element of claim 1 wherein said cellulose fiber containing paper further comprises noncellulose fibers.

7. The imaging element of claim 6 wherein said non cellulose fibers comprise polymer fibers.

8. The imaging element of claim 6 wherein said noncellulose fibers comprise polymer fibers of a length of between 0.2 and 5 mm.

9. The imaging element of claim 6 wherein said noncellulose fibers comprise polymer fibers that are woven or of substantially continuous strand.

10. The imaging element of claim 1 wherein said cellulose fiber containing paper further comprises cellulose fibers that have been modified to increase fiber strength.

11. The imaging element of claim 6 wherein said noncellulose fibers comprise fiber glass.

12. The imaging element of claim 6 wherein said noncellulose fibers comprise fiber glass arranged in substantially continuous fibers extending in the machine direction.

13. The imaging element of claim 6 wherein said noncellulose fibers comprise fibers that have been sized to aid in binding with cellulose fibers.

14. The imaging element of claim 1 wherein said cellulose fiber containing paper further comprises a matrix polymer.

15. The imaging element of claim 14 wherein said matrix polymer comprises a latex polymer.

16. The imaging element of claim 14 wherein said matrix polymer comprises a polymer wherein said polymer consists of at least one member selected from the group consisting of styrene-butadiene copolymer, acrylate resins, polyvinyl acetate, natural rubber, polyvinyl alcohol, methacrylates, and styrenes.

17. The imaging element of claim 14 wherein said cellulose fibers comprise at least 10 percent by weight of said paper.

18. The imaging element of claim 14 wherein said matrix polymer comprises an ultraviolet curable polymer.

19. The imaging element of claim 6 wherein said cellulose fibers comprise at least 50% percent by weight of said paper.

20. The imaging element of claim 1 wherein said cellulose fiber paper comprises cellulose fibers that have been provided with surface chemicals that aid in chemical bonding between said cellulose fibers.

21. The imaging element of claim 1 wherein said cellulose fiber paper comprises a layered structure wherein the cellulose fibers in a middle layer comprise softwood kraft fibers.

22. The imaging element of claim 21 wherein the surface layers of said layered structure comprise hardwoods or sulfite softwood fibers.

23. The imaging element of claim 1 wherein said base is provided with at least one biaxially oriented polyolefin sheet adhered to the surface of said paper.

24. The imaging element of claim 1 wherein said base is provided on at least one side with at least two polymer layers that have been simultaneously extruded onto said paper.

25. The imaging element of claim 1 wherein said at least one melt extruded polyester layer is between 5 and 100 $\mu$m thick.

26. An imaging element comprising a base comprising a cellulose fiber containing paper, wherein said paper has a tear resistance of between 200 and 1800 Newton wherein said paper has a surface roughness of between 0.30 and 0.95 $\mu$m at a spatial frequency of between 200 cycles/mm and 1300 cycles/mm.

27. The imaging element of claim 26 wherein said paper has a stiffness of greater than 120 millinewtons.

28. The imaging element of claim 27 wherein said paper has a ratio of elastic modulus in the machine direction to elastic modulus in the cross direction of between 1.9 and 1.2.

29. The imaging element of claim 26 wherein said cellulose fiber containing paper further comprises polymer fibers.

30. The imaging element of claim 26 wherein said cellulose fiber containing paper further comprises a matrix polymer.

31. The imaging element of claim 26 wherein said matrix polymer comprises a latex polymer.

32. The imaging element of claim 30 wherein said matrix polymer comprises a polymer wherein said polymer consists of at least one member selected from the group consisting of styrene-butadiene copolymer, acrylate resins, polyvinyl acetate, natural rubber, polyvinyl alcohol, methacrylates, and styrenes.

33. The imaging clement of claim 30 wherein said matrix polymer comprises an ultraviolet curable polymer.

34. The imaging element of claim 29 wherein said cellulose fibers comprise at least 50% percent by weight of said paper.

35. The imaging element of claim 26 wherein said cellulose fiber paper comprises a layered structure wherein the cellulose fibers in a middle layer comprise softwood kraft fibers.

36. The imaging element of claim 35 wherein the surface layers of said layered structure comprise hardwoods or sulfite softwood fibers.

37. The imaging element of claim 26 wherein said base is provided with at least one biaxially oriented polyolefin sheet adhered to the surface of said paper.

38. The imaging element of claim 26 wherein said base is provided with at least one melt extruded polyester layer between 5 and 100 μm thick.

39. The imaging element of claim 26 wherein said base is provided on at least one side with at least two polymer layers that have been simultaneously extruded onto said paper.

40. An imaging element comprising a base comprising a cellulose fiber containing paper, wherein said paper has a tear resistance of between 200 and 1800 Newton wherein said cellulose fiber containing paper further comprises non-cellulose polymer fibers.

41. The imaging element of claim 40 wherein said paper has a stiffness of greater than 120 millinewtons.

42. The imaging element of claim 41 wherein said paper has a surface roughness of between 0.30 and 0.95 μm at a spatial frequency of between 200 cycles/mm and 1300 cycles/mm.

43. The imaging element of claim 40 wherein said non-cellulose polymer fibers comprise polymer fibers of a length of between 0.2 and 5 mm.

44. The imaging element of claim 40 wherein said non-cellulose polymer fibers comprise polymer fibers that are woven or of substantially continuous strand.

45. The imaging element of claim 40 wherein said non-cellulose fibers comprise fibers that have been sized to aid in binding with cellulose fibers.

46. The imaging element of claim 40 wherein said cellulose fiber containing paper further comprises a matrix polymer.

47. The imaging element of claim 46 wherein said matrix polymer comprises a latex polymer.

48. The imaging element of claim 47 wherein said matrix polymer comprises an ultraviolet curable polymer.

49. The imaging element of claim 40 wherein said cellulose fibers comprise at least 50% percent by weight of said paper.

50. The imaging element of claim 40 wherein said cellulose fiber paper comprises a layered structure wherein the cellulose fibers in a middle layer comprise softwood kraft fibers.

51. The imaging element of claim 40 wherein said base is provided with at least one biaxially oriented polyolefin sheet adhered to the surface of said paper.

52. An imaging element comprising a base comprising a cellulose fiber containing paper, wherein said paper has a tear resistance of between 200 and 1800 Newton wherein said cellulose fiber containing paper further comprises an ultraviolet curable matrix polymer.

53. The imaging element of claim 52 wherein said matrix polymer comprises a latex polymer.

54. The imaging element of claim 53 wherein said paper has a surface roughness of between 0.30 and 0.95 μm at a spatial frequency of between 200 cycles/mm and 1300 cycles/mm.

55. The imaging element of claim 53 wherein said cellulose fiber containing paper further comprises noncellulose polymer fibers.

56. The imaging element of claim 52 wherein said matrix polymer comprises a polymer wherein said polymer consists of at least one member selected from the group consisting of styrene-butadiene copolymer, acrylate resins, polyvinyl acetate, natural rubber, polyvinyl alcohol, methacrylates, and styrenes.

57. The imaging element of claim 52 wherein said cellulose fibers comprise at least 10 percent by weight of said paper.

58. The imaging element of claim 52 wherein said base is provided with waterproof polyolefin layers on each side.

59. The imaging element of claim 52 wherein said base is provided with at least one biaxially oriented polyolefin sheet adhered to the surface of said paper.

60. The imaging element of claim 54 wherein said base is provided with at least one melt extruded polyester layer.

61. An imaging element comprising a base comprising a cellulose fiber containing paper, wherein said paper has a tear resistance of between 200 and 1800 Newton wherein said cellulose fiber paper comprises a layered structure wherein the cellulose fibers in a middle layer comprise softwood kraft fibers.

62. The imaging element of claim 61 wherein the surface layers of said layered structure comprise hardwoods or sulfite softwood fibers.

63. The imaging element of claim 61 wherein said base further is provided with waterproof layers.

64. The imaging element of claim 63 wherein said paper has a surface roughness of between 0.30 and 0.95 μm at a spatial frequency of between 200 cycles/mm and 1300 cycles/mm.

65. The imaging element of claim 63 wherein said cellulose fiber containing paper further comprises polymer noncellulose fibers.

66. The imaging element of claim 63 wherein said cellulose fiber containing paper further comprises a matrix polymer.

67. The imaging element of claim 66 wherein said matrix polymer comprises a polymer wherein said polymer consists of at least one member selected from the group consisting of styrene-butadiene copolymer, acrylate resins, polyvinyl acetate, natural rubber, polyvinyl alcohol, methacrylates, and styrenes.

68. The imaging element of claim 66 wherein said matrix polymer comprises an ultraviolet curable polymer.

69. The imaging element of claim 61 wherein said base is provided with waterproof polyolefin layers on each side.

70. The imaging element of claim 61 wherein said base is provided with at least one biaxially oriented polyolefin sheet adhered to the surface of said paper.

71. The imaging element of claim 66 wherein said base is provided with at least one melt extruded polyester layer.

72. An imaging element comprising a base comprising a cellulose fiber containing paper, wherein said paper has a tear resistance of between 200 and 1800 Newton wherein said base is provided with at least one biaxially oriented polyolefin sheet adhered to the surface of said paper.

73. The imaging element of claim 72 wherein said paper has a stiffness of greater than 120 millinewtons.

74. The imaging element of claim 73 wherein said paper has a surface roughness of between 0.30 and 0.95 μm at a spatial frequency of between 200 cycles/mm and 1300 cycles/mm.

75. The imaging element of claim 73 wherein said cellulose fiber containing paper further comprises noncellulose fibers.

76. The imaging element of claim 75 wherein said non-cellulose fibers comprise fiber glass.

77. The imaging element of claim 73 wherein said cellulose fiber containing paper further comprises a matrix polymer.

78. The imaging element of claim 72 wherein said matrix polymer comprises a latex polymer.

79. The imaging element of claim 77 wherein said cellulose fiber paper comprises a layered structure wherein the cellulose fibers in a middle layer comprise softwood kraft fibers.

* * * * *